United States Patent
Worrell et al.

(10) Patent No.: US 12,507,826 B2
(45) Date of Patent: Dec. 30, 2025

(54) INDUCTIVE BABY BOTTLE WARMER

(71) Applicant: Proxamama, Inc., Las Vegas, NV (US)

(72) Inventors: Bob Worrell, Las Vegas, NV (US); Shilo Ben Zeev, Las Vegas, NV (US)

(73) Assignee: Proxamama, Inc., Las Vegas, NV (US)

( * ) Notice: Subject to any disclaimer, the term of this patent is extended or adjusted under 35 U.S.C. 154(b) by 0 days.

(21) Appl. No.: 19/036,945

(22) Filed: Jan. 24, 2025

(65) Prior Publication Data

US 2025/0235042 A1    Jul. 24, 2025

Related U.S. Application Data

(60) Provisional application No. 63/624,393, filed on Jan. 24, 2024.

(51) Int. Cl.
| | |
|---|---|
| *H05B 6/36* | (2006.01) |
| *A47J 36/24* | (2006.01) |
| *A61J 9/02* | (2006.01) |
| *A61J 9/08* | (2006.01) |
| *A61L 2/07* | (2006.01) |
| *B01F 27/113* | (2022.01) |
| *H05B 6/06* | (2006.01) |

(Continued)

(52) U.S. Cl.
CPC ............ *A47J 36/2433* (2013.01); *A61J 9/02* (2013.01); *A61J 9/085* (2013.01); *A61L 2/07* (2013.01); *B01F 27/113* (2022.01); *H05B 6/062* (2013.01); *H05B 6/108* (2013.01); *A61J 2200/42* (2013.01); *A61J 2200/70* (2013.01); *A61L 2202/121* (2013.01); *A61L 2202/122* (2013.01); *A61L 2202/23* (2013.01); *B01F 2101/06* (2022.01); *H05B 2213/07* (2013.01)

(58) Field of Classification Search
CPC .. A47J 36/2411; A47J 36/2433; B01F 27/113; A61J 9/02
USPC ....... 219/634, 628, 600, 618, 626, 627, 630, 219/635, 663, 665, 240, 386, 435, 436, 219/437, 438, 441, 433, 523; 99/483
See application file for complete search history.

(56) References Cited

U.S. PATENT DOCUMENTS

| | | |
|---|---|---|
| 4,707,213 A | 11/1987 | Mohr et al. |
| 5,274,215 A | 12/1993 | Jackson |
| 9,066,374 B2 | 6/2015 | Graber et al. |

(Continued)

FOREIGN PATENT DOCUMENTS

| | | | | |
|---|---|---|---|---|
| CA | 3016047 A1 | * | 2/2020 | ............ A47J 27/002 |
| CN | 219847423 U | * | 10/2023 | |

*Primary Examiner* — Quang T Van
(74) *Attorney, Agent, or Firm* — Greenberg Traurig, LLP

(57) ABSTRACT

A system includes a warming base including a body having a top surface, a recess formed in the top surface, and an induction coil positioned within the body below the recess; a fluid container having an opening; and a lid including a lid body and a conductive heat plate positioned within the lid body, wherein the lid is configured to be removably attached to the opening to close the fluid container, wherein the lid body has a size and shape that are complementary to the recess of the warming base, so as to allow lid to mate with the recess to position the conductive heat plate a suitable distance from the induction coil such that, when a current is applied to the induction coil, a magnetic field generated by the induction coil causes the conductive heat plate to heat, thereby heating contents of the fluid container.

20 Claims, 25 Drawing Sheets

(51) Int. Cl.
*H05B 6/10* (2006.01)
*B01F 101/06* (2022.01)

(56) References Cited

U.S. PATENT DOCUMENTS

| | | |
|---|---|---|
| 11,272,807 B2 | 3/2022 | Hanneken |
| 2008/0041859 A1 | 2/2008 | Teglbjarg |
| 2011/0067576 A1 | 3/2011 | White et al. |
| 2014/0091083 A1 | 4/2014 | McGarvey |
| 2014/0348987 A1 | 11/2014 | Cheng et al. |
| 2018/0279826 A1* | 10/2018 | Chung .................. H05B 6/36 |
| 2020/0069103 A1 | 3/2020 | Baldwin et al. |
| 2023/0148675 A1 | 5/2023 | Lee |

\* cited by examiner

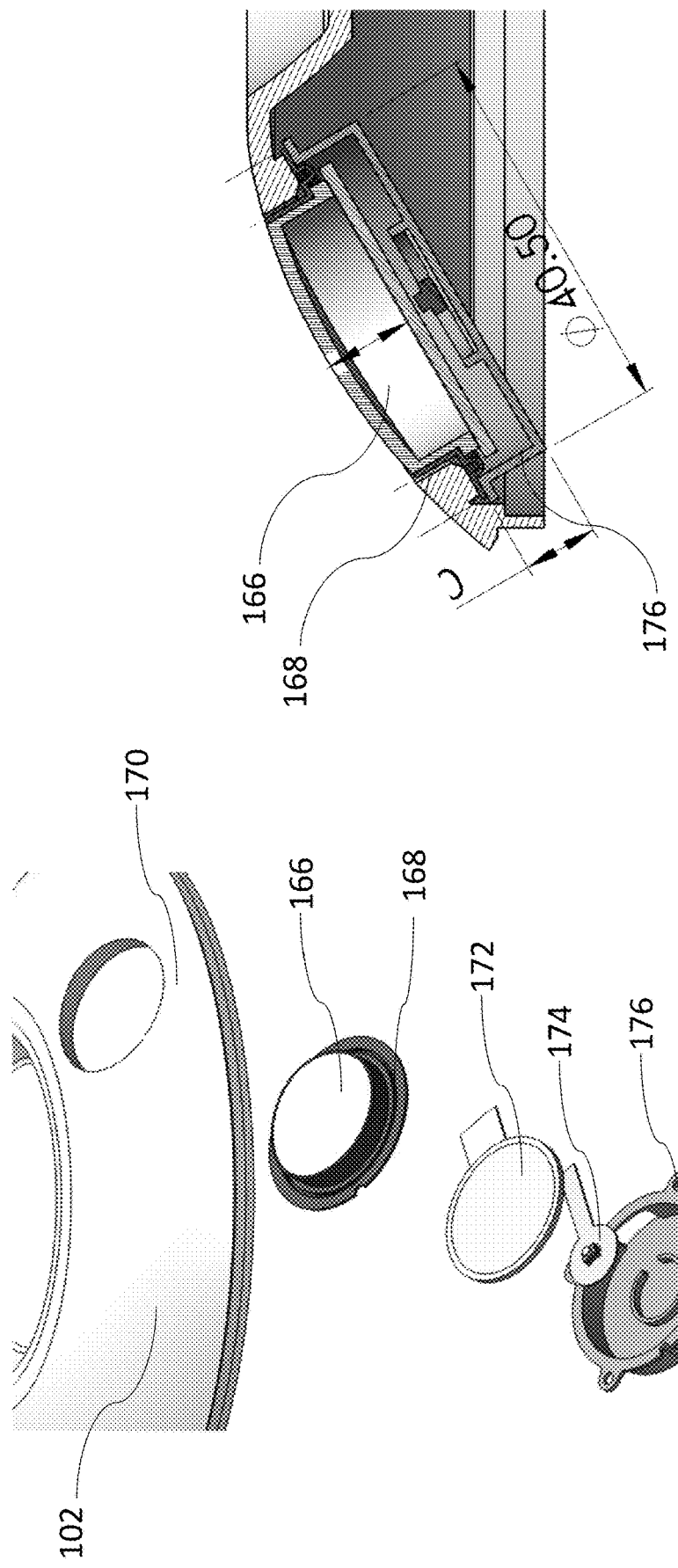

INDUCTIVE BABY BOTTLE WARMER

CROSS-REFERENCE

This is a Section 111(a) patent application relating to and claiming the benefit of U.S. Provisional Patent Application No. 63/624,393, filed on Jan. 24, 2024, and entitled "INDUCTIVE BABY BOTTLE WARMER," the contents of which are incorporated herein by reference in their entirety.

FIELD OF INVENTION

The present disclosure relates generally to the field of infant bottle heating and sterilization devices and, more particularly, to systems and methods for heating an infant bottle using induction heating.

BACKGROUND

Parents or other infant caretakers often prefer to heat up liquids such as milk, formula or cereal that they feed to infants because the heated liquids are closer to the temperature of breast milk. Additionally, babies, especially newborns, tend to find heated liquids more relaxing and easier to consume than cold or room-temperature liquids. There are many methods to heat liquids for infants however, use of a bottle warmer is generally thought to be the safest and fastest method.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

FIG. 12 is an exploded view of a user interface of the warming base, according to embodiments of the present disclosure.

FIG. 13 is a side cross-sectional view of the user interface of the warming base, according to embodiments of the present disclosure.

SUMMARY OF THE DISCLOSURE

Figure 1:
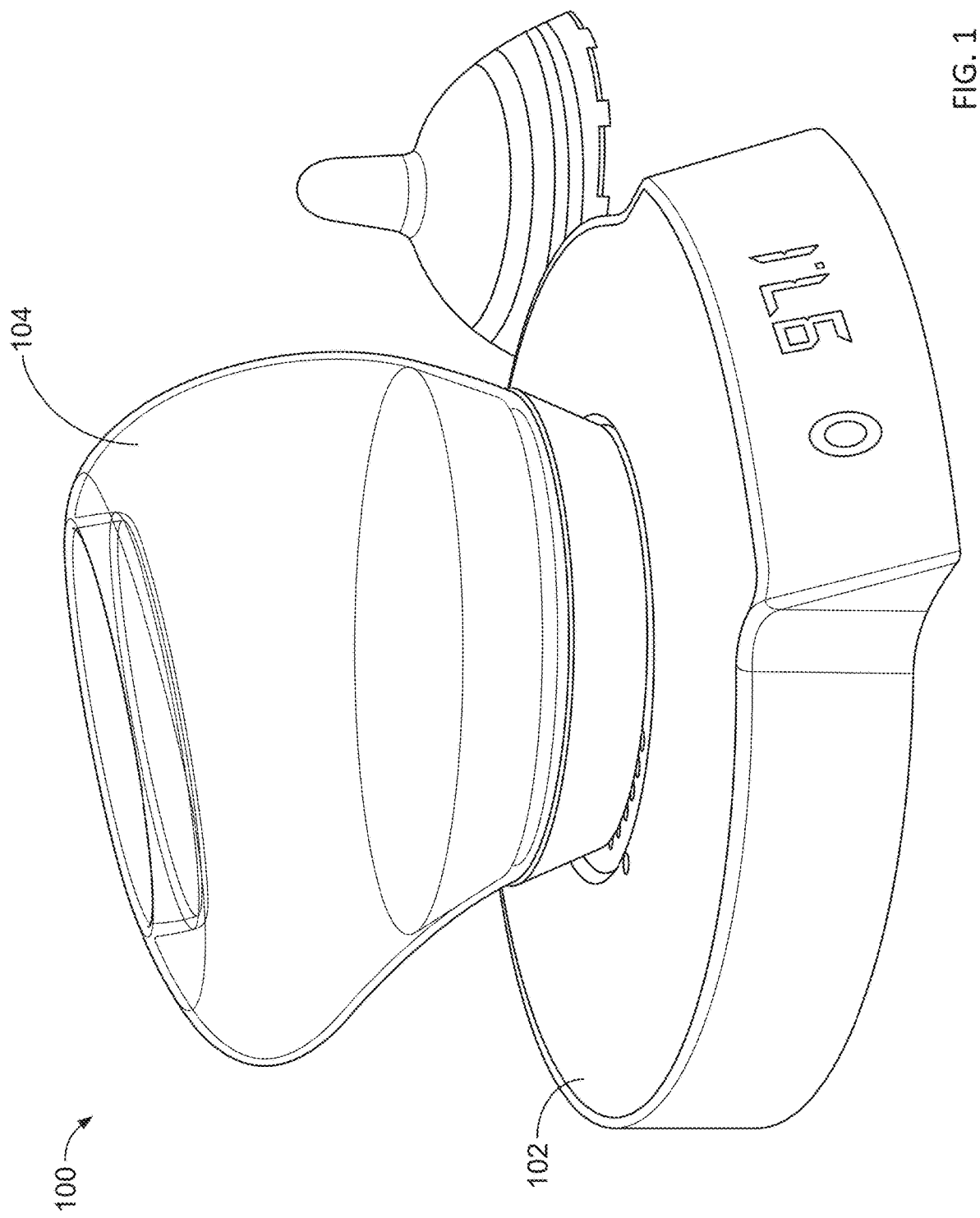
FIG. 1 is a perspective view of a bottle warming system, according to embodiments of the present disclosure.

In some embodiments, a system includes a warming base including a body having a top surface and a recess formed in the top surface and an induction coil positioned within the body below the recess; a fluid container having an opening; and a lid including a lid body, and a conductive heat plate positioned within the lid body, wherein the lid is configured to be removably attached to the opening so as to close the fluid container, wherein the lid body has a size and shape that are complementary to the recess of the warming base, so as to be configured for the lid to mate with the recess of the warming base to result in the conductive heat plate being positioned a suitable distance from the induction coil of the warming base, wherein the suitable distance is a distance such that, when an electrical current is applied to the induction coil, a magnetic field generated by the induction coil causes the conductive heat plate to heat, thereby heating contents of the fluid container.

In some embodiments, the fluid container is a baby bottle.

In some embodiments, the lid also includes at least one turbine-shaped blade, wherein the at least one turbine-shaped blade is shaped so as to induce circulation of the contents of the fluid container when a temperature differential exists across the contents of the fluid container.

In some embodiments, the warming base also includes at least one sensor. In some embodiments, the at least one sensor includes a temperature sensor configured to detect a current temperature of the contents of the fluid container, and wherein, when the current temperature exceeds a threshold temperature, the warming base is configured to at least one of: (a) discontinue application of the electrical current to the induction coil, or (b) indicate to a user that the contents of the fluid container are ready for use. In some embodiments, the at least one sensor includes a pressure sensor. In some embodiments, the at least one sensor includes a proximity sensor configured to detect a presence or an absence of at least one of the fluid container or the lid within the recess, and wherein at least one of: (a) the warming base is configured to begin application of the electrical current to the induction coil when the proximity sensor detects the presence of the at least one of the fluid container or the lid within the recess, or (b) the warming base is configured to discontinue application of the electrical current to the induction coil when the proximity sensor detects the absence of the at least one of the fluid container or the lid within the recess.

In some embodiments, the system also includes a steaming system, wherein the steaming system includes: a steamer base that is shaped to contain water, a steamer conductive heat plate positioned within the steamer base, and a steamer cover configured to be coupled to the steamer base so as to define a fluid-tight sterilization chamber between the steamer cover and the steamer base, wherein the steamer base has a size and shape that are complementary to the recess of the warming base, so as to be configured for the steamer base to mate with the recess of the warming base to result in the steamer conductive heat plate being positioned a suitable distance from the induction coil of the warming base, wherein the suitable distance is a distance such that, when an electrical current is applied to the induction coil, a magnetic field generated by the induction coil causes the steamer conductive heat plate to heat, thereby heating water contained within the steamer base sufficiently to cause the water to form steam to thereby sterilize an object contained within the sterilization chamber. In some embodiments, the steamer cover comprises a vent that is movable between at least: a closed position, in which the vent prevents the steam from escaping the sterilization chamber, and an opened position, in which the vent allows at least some of the steam to escape the sterilization chamber through the vent.

In some embodiments, the system also includes at least one accessory sized and shaped to hold accessory contents, wherein the at least one accessory comprises an accessory conductive heat plate, wherein the at least one accessory has a size and shape that are complementary to the recess of the warming base, so as to be configured for the at least one accessory to mate with the recess of the warming base to result in the accessory conductive heat plate being positioned a suitable distance from the induction coil of the warming base, wherein the suitable distance is a distance such that, when an electrical current is applied to the induction coil, a magnetic field generated by the induction coil causes the accessory conductive heat plate to heat, thereby heating the accessory contents.

In some embodiments, the at least one accessory includes a defroster cup configured to hold a breast milk storage bag, a bowl configured to hold a pureed food, or a drinking vessel.

In some embodiments, a method includes attaching a lid to a fluid container, wherein the fluid container includes an opening, wherein the fluid container contains a fluid, wherein the lid includes: a lid body, and a conductive heat plate positioned within the lid body, wherein the lid is removably attached to the opening of the fluid container so as to close the fluid container; positioning the lid and the fluid container within a warming base, wherein the warming base includes: a body having a top surface and a recess formed in the top surface, and an induction coil positioned within the body below the recess, and wherein the positioning the lid and the fluid container within the warming base includes mating the lid with the recess of the warming base to result in the conductive heat plate being positioned a suitable distance from the induction coil of the warming base; and activating the warming base, wherein the step of activating the warming base results in the warming base applying an electrical current to the induction coil, and wherein application of the electrical current to the induction coil induces a magnetic field that is sufficient to heat the conductive heat plate, thereby causing the conductive heat plate to heat the fluid contained by the fluid container.

In some embodiments, the fluid container is a baby bottle.

In some embodiments, the method also includes prior to the step of positioning the lid and the fluid container within the warming base, engaging an adapter to the lid, wherein the adapter comprises an interior surface and an exterior surface opposite the interior surface, wherein the interior surface of the adapter has a size and shape that are complementary to the lid body so as to allow the lid body to be received and retained within the adapter, wherein the exterior surface of the adapter has a size and shape that are complementary to the recess of the warming base, so as to be configured for the adapter having the lid received and retained therein to mate with the recess of the warming base to result in the conductive heat plate of the lid being positioned the suitable distance from the induction coil of the warming base.

In some embodiments, the method also includes prior to the step of activating the warming base, setting a threshold heating temperature for the fluid, wherein the warming base comprises a temperature sensor configured to detect a current temperature of the fluid, and wherein, when the current temperature exceeds the threshold heating temperature, the warming base is configured to at least one of: (a) discontinue application of the electrical current to the induction coil, or (b) indicate to a user that the fluid is ready for use.

In some embodiments, the step of activating the warming base is performed using one of a user interface positioned on the warming base or a software application executed by an electronic device that is communicatively coupled to the warming base.

In some embodiments, a system includes a warming base, including: a body having a top surface and a recess formed in the top surface; and an induction coil positioned within the body below the recess; a fluid container having an opening; a lid, including: a lid body, and a conductive heat plate positioned within the lid body, wherein the lid is configured to be removably attached to the opening so as to close the fluid container; and an adapter having an interior surface and an exterior surface opposite the interior surface, wherein the interior surface of the adapter has a size and shape that are complementary to the lid body so as to allow the lid body to be received and retained within the adapter, wherein the exterior surface of the adapter has a size and shape that are complementary to the recess of the warming base, so as to be configured for the adapter having the lid received and retained therein to mate with the recess of the warming base to result in the conductive heat plate of the lid being positioned a suitable distance from the induction coil of the warming base, wherein the suitable distance is a distance such that, when an electrical current is applied to the induction coil, a magnetic field generated by the induction coil causes the conductive heat plate to heat, thereby heating contents of the fluid container.

In some embodiments, the fluid container is a baby bottle.

In some embodiments, the lid also includes at least one turbine-shaped blade, wherein the at least one turbine-shaped blade is shaped so as to induce circulation of the contents of the fluid container when a temperature differential exists across the contents of the fluid container.

In some embodiments, the warming base also includes at least one sensor, wherein the at least one sensor includes at least one of: (1) a temperature sensor configured to detect a current temperature of the contents of the fluid container, and wherein, when the current temperature exceeds a threshold temperature, the warming base is configured to at least one of: (a) discontinue application of the electrical current to the induction coil, or (b) indicate to a user that the contents of the fluid container are ready for use, (2) a pressure sensor, or (3) a proximity sensor configured to detect a presence or an absence of at least one of the fluid container or the lid within the recess, and wherein the warming base is configured to at least one of: (a) begin application of the electrical current to the induction coil when the proximity sensor detects the presence of the at least one of the fluid container or the lid within the recess, or (b) discontinue application of the electrical current to the induction coil when the proximity sensor detects the absence of the at least one of the fluid container or the lid within the recess.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "based on" is not exclusive and allows for being based on additional factors not described, unless the context clearly dictates otherwise. In addition, throughout the specification, the meaning of "a," "an," and "the" include plural references. The meaning of "in" includes "in" and "on." Spatial or directional terms, such as "left", "right", "inner", "outer", "above", "below", and the like, are not to be considered as limiting as the invention can assume various alternative orientations. All numbers used in the specification are to be understood as being modified in all instances by the term "about". The term "about" means a range of plus or minus ten percent of the stated value.

As used herein, the term "mobile electronic device", "electronic device" or the like, may refer to any electronic device that may include relevant software and hardware. As used herein, the term "mobile electronic device" or the like, may refer to any portable electronic device that may include relevant software and hardware. For example, a "mobile electronic device" can include, but is not limited to, any electronic computing device that is able to among other things receive and process alerts from a user including, but not limited to, a mobile phone, smart phone, or any other reasonable mobile electronic device that may or may not be enabled with a software application (App).

In some embodiments, a "mobile computing device" or "electronic device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Unless otherwise indicated, all ranges or ratios disclosed herein are to be understood to encompass any and all subranges or sub-ratios subsumed therein. Unless otherwise indicated, all ranges or ratios herein are understood to be inclusive (i.e., to include both the minimum and maximum values of such ranges or ratios). For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to, 1 to 6.1, 3.5 to 7.8, and 5.5 to 10.

In some embodiments, the present disclosure relates to an infant bottle warmer system that includes inductive heating technology. The benefit of inductive heating technology is that, in some embodiments, there are no surfaces on the infant bottle warmer that get hot, so the base of the warmer, upon which an infant bottle is placed, is safe to touch. In some embodiments, the infant bottle warmer is configured to capture data. For example, in some embodiments, the entire system may sit on at least one integrated pressure sensor to determine a volume of liquid in an infant bottle to be warmed. In some embodiments, the known weight of the infant bottle warmer unit plus the weight of an empty infant bottle is subtracted from the weight of the infant bottle warmer unit with any given amount of liquid in the infant bottle. In some embodiments, the difference in weight is converted by the device to calculate the liquid volume at the start of feeding. In some embodiments, a caregiver can choose to replace the bottle onto the warmer at the conclusion of feeding thereby determining the volume of liquid the infant consumed. In some embodiments, the warmer unit has a timer to indicate at what time the warmed bottle is removed, thus calculating the time of the initiation of feeding. Again, in some embodiments, if the caregiver chooses to replace the bottle on the warmer after feeding the system calculates the amount of time the feeding took. In some embodiments, the system also incorporates a sensor to determine when the milk volume in the bottle reaches a predetermined and desired temperature, thus signaling the system and caregiver that the bottle is ready for feeding.

In some embodiments, the system includes a wireless communication capability to enable the warmer to interface with a mobile application software (e.g., an "app"), wireless remote control device, or to exchange data or settings. In some embodiments, the device includes a memory to store data and settings.

Turning to FIG. 1, a bottle warming system 100 according to a first embodiment of the present disclosure is depicted. In some embodiments, the bottle warming system 100 includes a bottle warming device or warming base 102 and an infant bottle 104 configured to be positioned on the warming base 102. In some embodiments, the infant bottle 104 is configured to hold fluids such as, for example, milk, formula, cereal or water, to be warmed and subsequently fed to a baby. However, in some embodiments, the bottle 104 may be alternatively arranged for other purposes and/or to hold other fluids.

Figure 2:
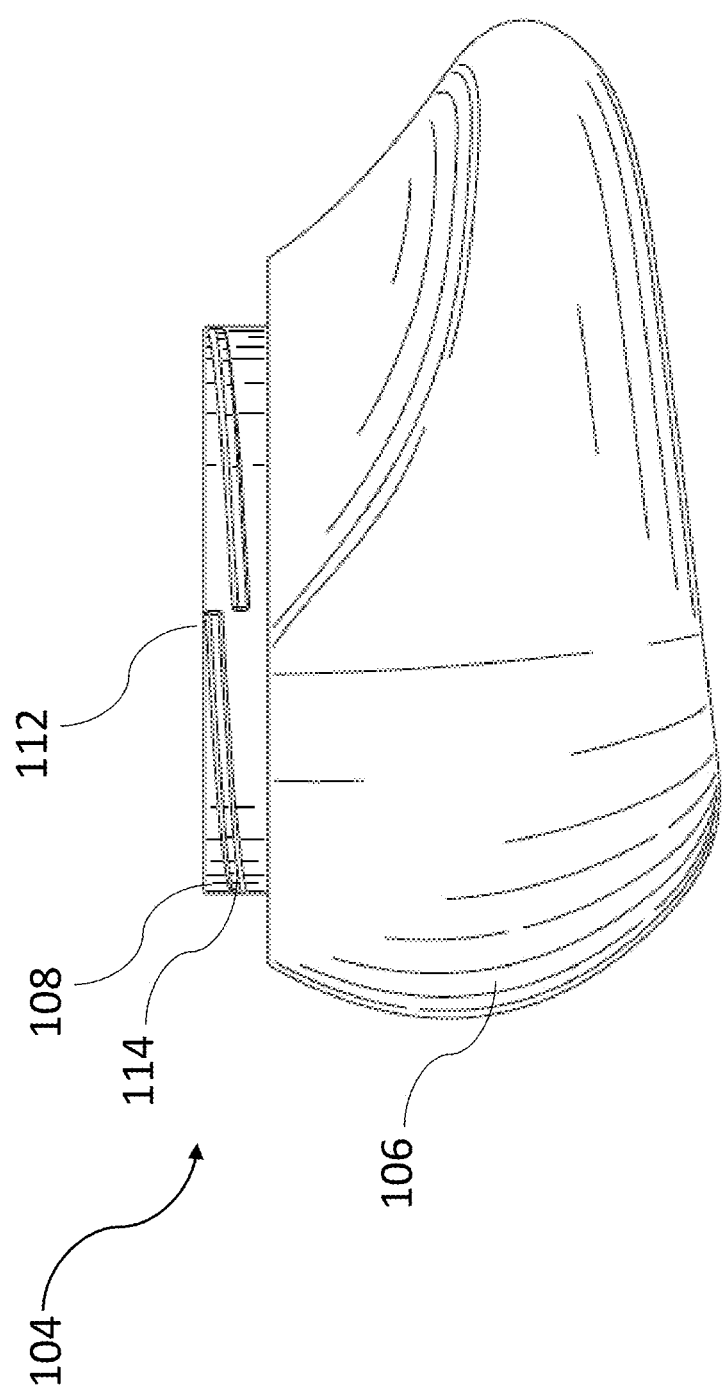
FIG. 2 is a perspective view of a bottle of the bottle warming system, according to embodiments of the present disclosure.

As depicted in FIG. 2, in some embodiments, the bottle 104 includes a fluid reservoir 106 for containing the desired liquid. In some embodiments, the bottle 104 may be any shape such as, for example, oval, spherical, cylindrical, etc. In some embodiments, the bottle 104 is formed of a rigid material. In other embodiments, the bottle 104 is formed of a flexible material to allow compression of the fluid reservoir 106. In some embodiments, the bottle 104 can hold from 4 oz to 8 oz of fluid; or from 4 oz to 6 oz of fluid, or from 6 oz to 8 oz of fluid.

In some embodiments, the bottle 104 includes a neck portion 108 configured for coupling the bottle 104 to a lid assembly 110, discussed in further detail below. In some embodiments, the neck portion 108 has a smaller diameter than the fluid reservoir 106 and extends co-axially from the bottle 104. In some embodiments, the neck portion 108 includes threading 114 on an exterior surface thereof for engaging with a first threading 116 on an interior surface of the lid assembly 110. In some embodiments, the neck portion 108 includes an opening 112.

FIGS. 3-6 depict a lid assembly 110, according to some embodiments of the present disclosure. In some embodiments, the lid assembly 110 is configured to heat the liquid within the bottle 104. In some embodiments, the lid assembly 110 includes a main lid 122 (e.g., a lid body) and a heat plate 118. In some embodiments, the lid assembly 110 also includes a turbine-shaped retainer 120. In some embodiments, each of the heat plate 118 and the turbine-shaped retainer 120 are configured to be removably positioned within the main lid 122. In some embodiments, the lid assembly 110 is configured to retain the liquid within the bottle 104 when the bottle 104 is place upside down onto the warming base 102.

Figure 4:
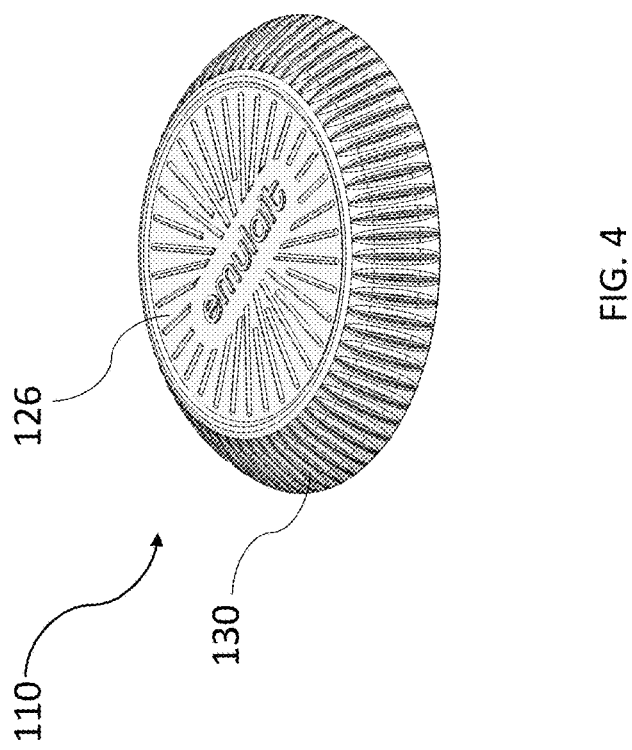
FIG. 4 is a perspective view of a main lid of the bottle lid assembly, according to embodiments of the present disclosure.
Figure 6:
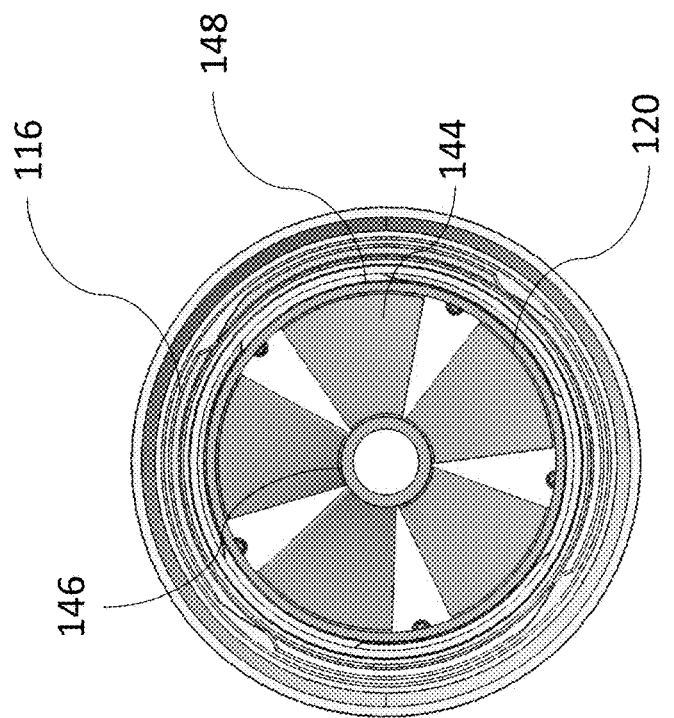
FIG. 6 is a bottom view of the bottle lid assembly, according to embodiments of the present disclosure.
Figure 5:
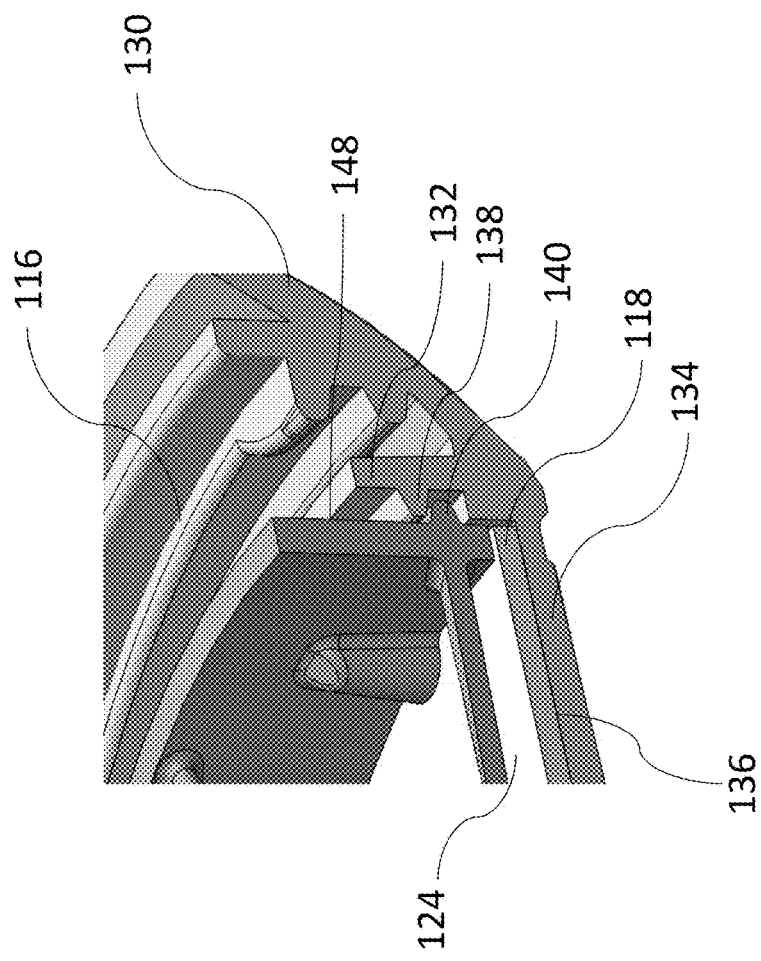
FIG. 5 is a cross-sectional view of a portion of the bottle lid assembly, according to embodiments of the present disclosure.

In some embodiments, the main lid 122 is formed of a plastic material and has a circular profile, as depicted in FIG. 4. In some embodiments, the main lid 122 includes a top wall 126, including an interior surface 134, and a side wall 130 extending circumferentially from the top wall 126 to form an interior hollow 128. In some embodiments, the main lid 122 includes the first internal threading 116 on an interior surface of the side wall 130 configured to retain the lid assembly 110 on the bottle 104, as depicted in FIGS. 5-6. In some embodiments, the main lid 122 includes a circumferential protrusion or mating wall 132 extending perpendicularly from an interior surface 134 of the top wall 126 into the interior hollow 128, as depicted in FIG. 5. In some embodiments, the mating wall 132 is configured to retain the heat plate 118 within the main lid 122. In some embodiments, the mating wall 132 may include a circumferential lip (not shown) extending inwardly into the interior hollow 128 configured to retain the heat plate 118 therein. Alternatively, in some embodiments, the mating wall 132 may include an internal retaining feature 138 configured to engage with an external retaining feature 140 of the turbine-shaped retainer 120, as depicted in FIG. 5. In some embodiments, the internal retaining feature 138 of the mating wall 132 and the external retaining feature 140 of the turbine-shaped retainer 120 may each be a threading. However, in other embodiments, the retaining features 138, 140 may be, for example, a groove and ridge features that allow for snap engagement. In other embodiments, the turbine-shaped retainer 120 may be removably inserted within the mating wall 132 using any other suitable retaining features. In some embodiments, the heat plate 118 is held in place by insertion of the turbine-shaped retainer 120 into the main lid 122, as depicted in FIG. 5 and as will be described in further detail below.

In some embodiments, the heat plate 118 is generally disc-shaped including a first surface 124 configured to contact fluid within the bottle and an opposite second surface 136 positioned adjacent to the interior surface 134 of the main lid 122, as depicted in FIG. 5. In some embodiments, the heat plate 118 is a conductive heat plate that is formed of a conductive metal suitable for induction heating (e.g., a metal having a conductivity of at least $1 \times 10^6$ S/m at 20 degrees Celsius). For example, in some embodiments, the heat plate 118 may include a ferrous material such as iron or steel. In some embodiments, the heat plate 118 may include a non-ferrous material such as copper, aluminum, gold, silver, or platinum. In some embodiments, the heat plate 118 is configured to be excited and heated by an inductive heating coil 160 in the warming base 102, as will be discussed in further detail below. In turn, in some embodiments, the heat plate 118 heats the fluid in contact with a first surface 124 thereof.

In some embodiments, the heat plate 118 is sized and shaped to be positioned adjacent to an interior surface of the main lid 122, as depicted in FIG. 5. In some embodiments, the heat plate 118 has an outer diameter of 59.5 mm. In some embodiments, the heat plate 118 has an outer diameter of 55 mm to 65 mm. In some embodiments, the heat plate 118 has an outer diameter of 57 mm to 65 mm. In some embodiments, the heat plate 118 has an outer diameter of 59 mm to 65 mm. In some embodiments, the heat plate 118 has an outer diameter of 61 mm to 65 mm. In some embodiments, the heat plate 118 has an outer diameter of 63 mm to 65 mm.

In some embodiments, the heat plate 118 has an outer diameter of 55 mm to 63 mm. In some embodiments, the heat plate 118 has an outer diameter of 55 mm to 61 mm. In some embodiments, the heat plate 118 has an outer diameter of 55 mm to 59 mm. In some embodiments, the heat plate 118 has an outer diameter of 55 mm to 57 mm.

In some embodiments, the heat plate 118 has an outer diameter of 57 mm to 63 mm. In some embodiments, the heat plate 118 has an outer diameter of 57 mm to 61 mm. In some embodiments, the heat plate 118 has an outer diameter of 57 mm to 59 mm. In some embodiments, the heat plate 118 has an outer diameter of 59 mm to 63 mm. In some embodiments, the heat plate 118 has an outer diameter of 59 mm to 61 mm. In some embodiments, the heat plate 118 has an outer diameter of 61 mm to 63 mm.

In some embodiments, the heat plate 118 has an outer diameter of 55 mm to 75 mm. In some embodiments, the heat plate 118 has an outer diameter of 60 mm to 75 mm. In some embodiments, the heat plate 118 has an outer diameter of 65 mm to 75 mm. In some embodiments, the heat plate 118 has an outer diameter of 70 mm to 75 mm. In some embodiments, the heat plate 118 has an outer diameter of 55 mm to 70 mm. In some embodiments, the heat plate 118 has an outer diameter of 60 mm to 70 mm. In some embodiments, the heat plate 118 has an outer diameter of 65 mm to 70 mm.

In some embodiments the heat plate 118 has a thickness (i.e., a dimension extending between the first surface 124 and the second surface 136) of 1 mm to 2 mm. In some embodiments, the heat plate 118 has a thickness of 1 mm to 1.8 mm. In some embodiments, the heat plate 118 has a thickness of 1 mm to 1.6 mm. In some embodiments, the heat plate 118 has a thickness of mm to mm. In some embodiments, the heat plate 118 has a thickness of 1 mm to 1.4 mm. In some embodiments, the heat plate 118 has a thickness of 1 mm to 1.2 mm.

In some embodiments, the heat plate 118 has a thickness of 1.2 mm to 2 mm. In some embodiments, the heat plate 118 has a thickness of 1.2 mm to 1.8 mm. In some embodiments, the heat plate 118 has a thickness of 1.2 mm to 1.6 mm. In some embodiments, the heat plate 118 has a thickness of 1.2 mm to 1.4 mm.

In some embodiments, the heat plate 118 has a thickness of 1.4 mm to 2 mm. In some embodiments, the heat plate 118 has a thickness of 1.4 mm to 1.8 mm. In some embodiments, the heat plate 118 has a thickness of 1.4 mm to 1.6 mm. In some embodiments, the heat plate 118 has a thickness of 1.6 mm to 2 mm. In some embodiments, the heat plate 118 has a thickness of 1.6 mm to 1.8 mm. In some embodiments, the heat plate 118 has a thickness of 1.8 mm to 2 mm.

Figure 3:
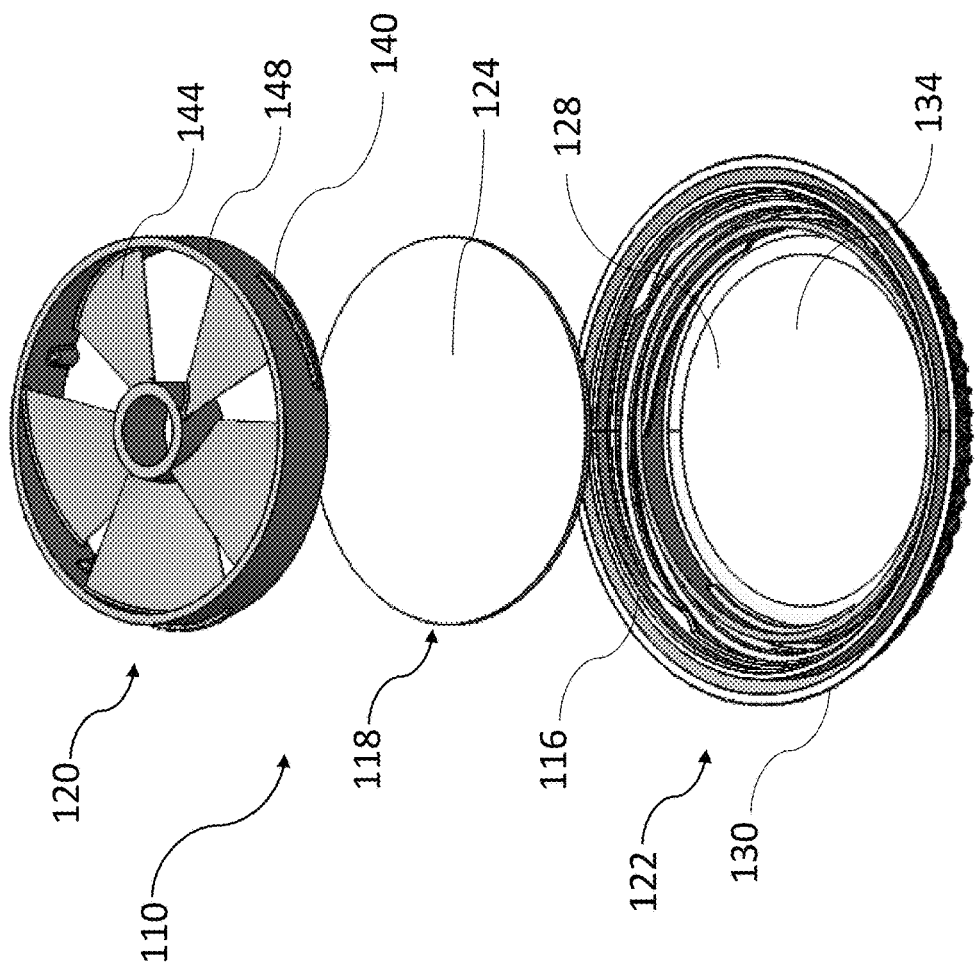
FIG. 3 is an exploded view of a bottle lid assembly of the bottle warming system, according to embodiments of the present disclosure.

As discussed above, in some embodiments, the lid assembly 110 includes the turbine-shaped retainer 120. In some embodiments, the turbine-shaped retainer 120 holds the heat plate 118 in position within the lid assembly 110 and protects a user's fingers from touching the hot heat plate 118. In some embodiments, the turbine-shaped retainer 120 is generally cylindrical in shape with an external wall 148 configured to be positioned within the circumferential mating wall 132. In some embodiments, the turbine-shaped retainer 120 includes a plurality of turbine blades 144. In some embodiments, the plurality of turbine blades 144 are configured to be stationary (e.g., do not move with respect to the other elements of the lid assembly 110 when the lid assembly 110 is assembled and is coupled to the bottle 104). In some embodiments, the turbine blades 144 are configured to spirally channel heated milk coming off of the heat plate 118 upward into the liquid volume within the reservoir 106 due to a temperature differential that may exist between heated milk closer to the heat plate 118 and cooler milk within the bottle 104 further from the heat plate 118, as depicted in FIGS. 3 and 6, thereby inducing circulation of the heated milk. In some embodiments, the turbine blades 144 also cause a natural turbulence to help mix the heated liquid more uniformly into the colder liquid within the reservoir 106.

In some embodiments, the turbine-shaped retainer 120 has an outer diameter of 30 mm to 70 mm. In some embodiments, the turbine-shaped retainer 120 has an outer diameter of 30 mm to 60 mm. In some embodiments, the turbine-shaped retainer 120 has an outer diameter of 30 mm to 50 mm. In some embodiments, the turbine-shaped retainer 120 has an outer diameter of 30 mm to 40 mm. In some embodiments, the turbine-shaped retainer 120 has an outer diameter of 40 mm to 70 mm.

In some embodiments, the turbine-shaped retainer 120 has an outer diameter of 40 mm to 60 mm. In some embodiments, the turbine-shaped retainer 120 has an outer diameter of 40 mm to 50 mm. In some embodiments, the turbine-shaped retainer 120 has an outer diameter of 50 mm to 70 mm. In some embodiments, the turbine-shaped retainer 120 has an outer diameter of 50 mm to 60 mm. In some embodiments, the turbine-shaped retainer 120 has an outer diameter of 60 mm to 70 mm.

In some embodiments, the turbine-shaped retainer 120 has a height of 5 mm to 20 mm. In some embodiments, the turbine-shaped retainer 120 has a height of 5 mm to 15 mm. In some embodiments, the turbine-shaped retainer 120 has a height of 5 mm to 10 mm. In some embodiments, the turbine-shaped retainer 120 has a height of 10 mm to 20 mm. In some embodiments, the turbine-shaped retainer 120 has a height of 10 mm to 15 mm. In some embodiments, the turbine-shaped retainer 120 has a height of 15 mm to 20 mm.

In some embodiments, the turbine-shaped retainer 120 has a height of 8 mm to 12 mm. In some embodiments, the turbine-shaped retainer 120 has a height of 8 mm to 11 mm. In some embodiments, the turbine-shaped retainer 120 has a height of 8 mm to 10 mm. In some embodiments, the turbine-shaped retainer 120 has a height of 8 mm to 9 mm. In some embodiments, the turbine-shaped retainer 120 has a height of 9 mm to 12 mm. In some embodiments, the turbine-shaped retainer 120 has a height of 9 mm to 11 mm. In some embodiments, the turbine-shaped retainer 120 has a height of 9 mm to 10 mm. In some embodiments, the turbine-shaped retainer 120 has a height of 10 mm to 12 mm. In some embodiments, the turbine-shaped retainer 120 has a height of 10 mm to 11 mm. In some embodiments, the turbine-shaped retainer 120 has a height of 11 mm to 12 mm.

In some embodiments, the turbine blades 144 extend outwardly from a central tube 146 to the external wall 148, as depicted in FIG. 6. In some embodiments, the turbine blades 144 are angled relative to a horizontal plane of the turbine-shaped retainer 120. Specifically, in some embodiments, the turbine blades 144 are angled toward the reservoir 106 such that the heated liquid flows into the volume of the unheated liquid within the reservoir 106. In some embodiments, the turbine-shaped retainer 120 includes five turbine blades 144, as depicted in FIG. 3. In some embodiments, the turbine-shaped retainer 120 includes from three to seven turbine blades 144. In some embodiments, the turbine-shaped retainer 120 includes from four to seven turbine blades 144. In some embodiments, the turbine-shaped retainer 120 includes from five to seven turbine blades 144. In some embodiments, the turbine-shaped retainer 120 includes from six to seven turbine blades 144.

In some embodiments, the turbine-shaped retainer 120 includes from three to six turbine blades 144. In some embodiments, the turbine-shaped retainer 120 includes from three to five turbine blades 144. In some embodiments, the turbine-shaped retainer 120 includes from three to four turbine blades 144.

In some embodiments, the turbine-shaped retainer 120 includes from four to six turbine blades 144. In some embodiments, the turbine-shaped retainer 120 includes from five to six turbine blades 144. In some embodiments, the turbine-shaped retainer 120 includes from four to five turbine blades 144.

In some embodiments, the lid assembly 110 or the bottle 104 may include a mechanical vibrator or other agitator configured to circulate the warmed liquid into the liquid volume within the reservoir 106.

In some embodiments, the lid assembly 110 may include a temperature sensor configured to determine a temperature of the warmed liquid within the bottle 104. In some embodiments, the temperature sensor may be positioned on any portion of the lid assembly 110 that is in direct contact with the warmed liquid, such as, for example, the main lid 122. In some embodiments, the lid assembly 110 may include communication circuitry/devices such as antennae and/or NFC (near-field communication) circuitry for transmitting the temperature sensor readings. In some embodiments, the lid assembly 110 may include an NFC chip. In some embodiments, the NFC circuitry may be configured to communicate with the warming base 102 or a mobile device of the user.

Figure 7:
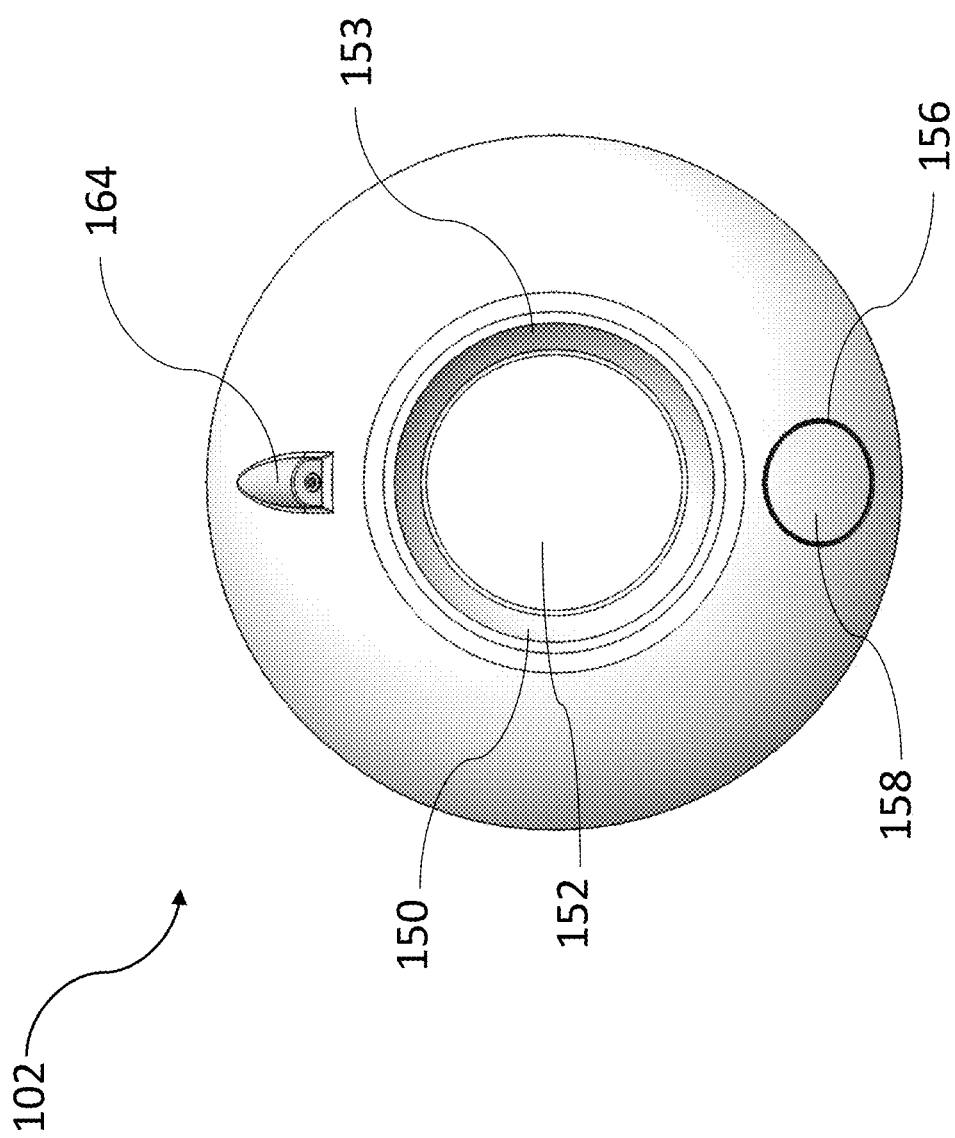
FIG. 7 is a top view of a warming base of the bottle warming system, according to embodiments of the present disclosure.
Figure 8:
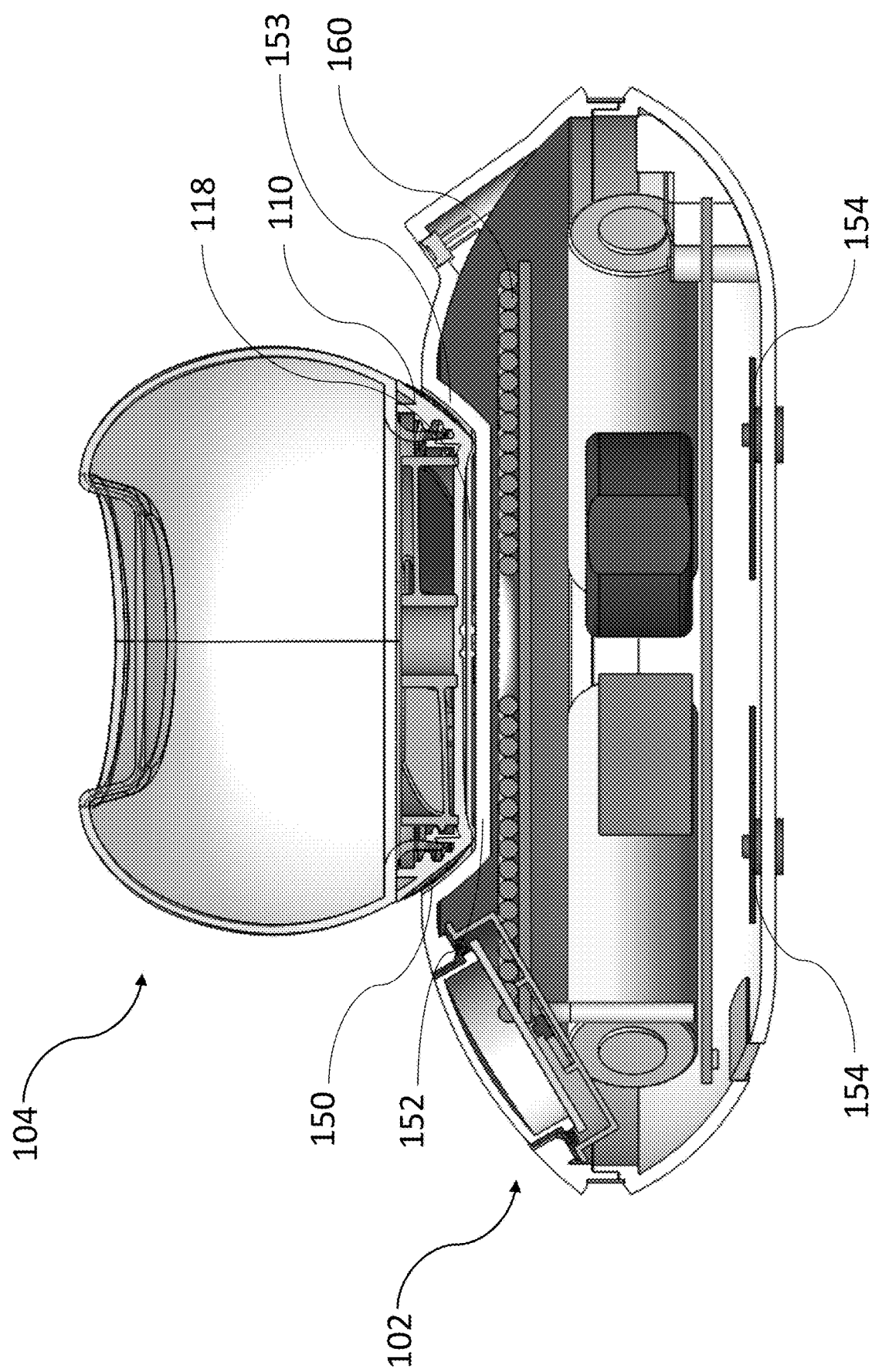
FIG. 8 is a cross-sectional view of the bottle warming system, according to embodiments of the present disclosure.

FIGS. 7-8 depict a warming base 102 according to embodiments of the present disclosure. In some embodiments, the warming base 102 has a body that includes a top surface and a recess 150 formed in the top surface, into which the lid assembly 110, coupled to the bottle 104, may be received such that the lid assembly 110 and bottle 104 are supported by the warming base 102 (e.g., the bottle 104 and the lid assembly 110 are inserted into the recess 150 "upside down" with the bottle 104 above the lid assembly 110). In some embodiments, the recess 150 has a circular cross-section and has a size and depth such that the lid assembly 110 can be received in the recess 150. In some embodiments, the recess 150 includes a recess floor 152, upon which the lid assembly 110 stands. In some embodiments, the recess 150 includes a side wall 153. In some embodiments, the lid assembly 110 is sized in a manner complementary to the recess 150 such that, when the lid assembly 110 is positioned within the recess 150 as shown, for example, in FIG. 8, the lid assembly 110 abuts or is in close proximity to the side wall 153 about all or most of the perimeter of the lid assembly, thereby preventing the lid assembly 110 from sliding within the recess 150 and preventing the bottle 104 from tipping.

In some embodiments, the warming base 102 may be configured to provide a changing magnetic field to the heat plate 118 to cause electromagnetic induction within the heat plate 118 to heat fluid in the bottle 104. In some embodiments, induction heating may result in a substantially even distribution of heat across the heat transfer surface of the heat plate 118, avoiding any local hot spots which may occur with other conventional bottle warming devices. Furthermore, in some embodiments, the use of induction heating allows heating of the fluid within the bottle 104 without any surface of the warming base 102 being hot to the touch, helping to reduce burn injuries. In some embodiments, induction heating also improves the ease with which the bottle 104 and warming base 102 are coupled together, as well as facilitating cleaning of both parts, since electrical contacts are not required, enabling a simpler connecting arrangement and easy-clean surfaces to be provided.

Figure 9:
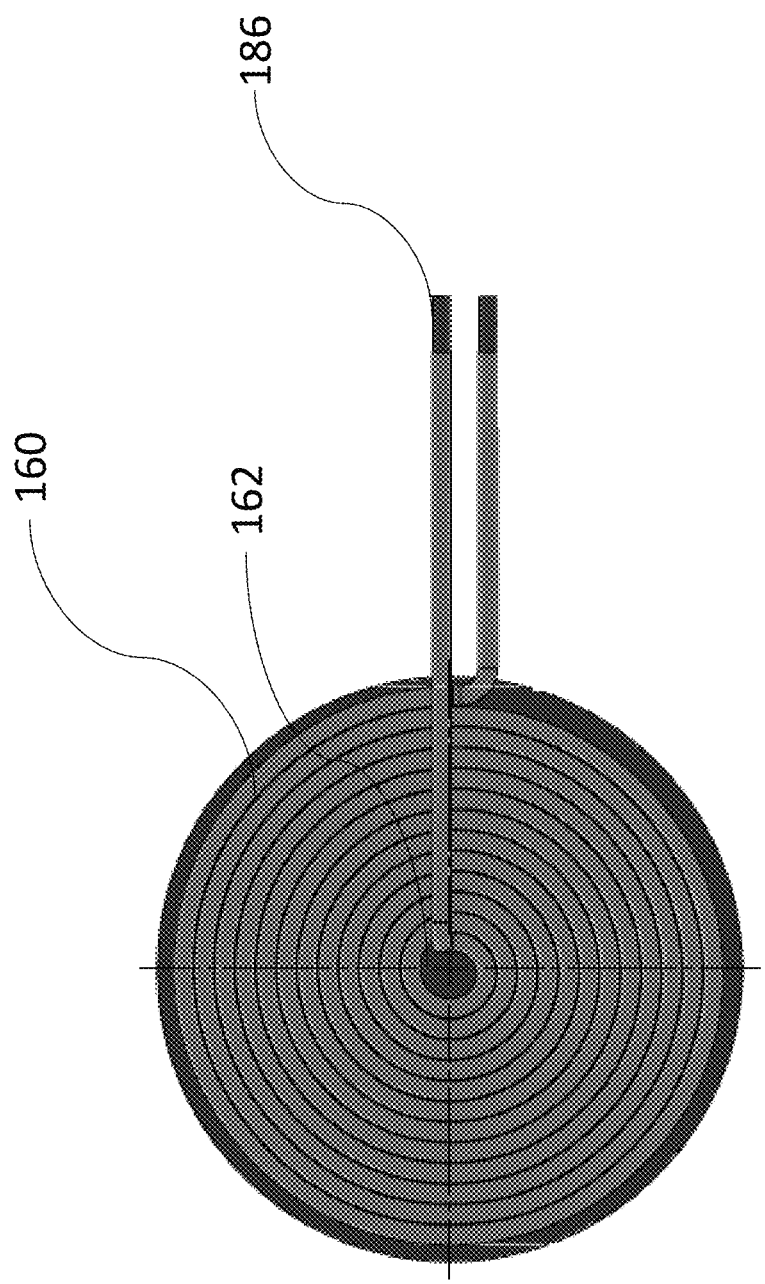
FIG. 9 is a top view of an inductive coil of the warming base, according to embodiments of the present disclosure.

In some embodiments, the warming base 102 includes an inductive coil 160, depicted in FIGS. 8 and 9. In some embodiments, the inductive coil 160 is configured such that, when an electrical current is applied to and runs through the inductive coil 160, a changing magnetic field is generated that is suitable to cause electromagnetic induction within the heat plate 118, thereby heating the heat plate 118. In some embodiments, the warming base 102 utilizes low voltage induction heating to heat the heat plate 118. In some embodiments, the inductive coil 160 is a flat, wound coil bonded to a ferrite core 162. In some embodiments, this configuration provides the inductive coil 160 with permanent shape retention. In some embodiments, the inductive coil 160 includes a copper wire. In some embodiments, the copper wire is a litz enameled copper wire. In some embodiments, the inductive coil 160 includes end leads 186 that are stripped and/or tinned.

In some embodiments, the warming base 102 is configured to provide induction heating at a voltage that is in a range of from 10 V to 30 V. In some embodiments, the warming base 102 is configured to provide induction heating at a voltage that is in a range of from 15 V to 30 V. In some embodiments, the warming base 102 is configured to provide induction heating at a voltage that is in a range of from 20 V to 30 V. In some embodiments, the warming base 102 is configured to provide induction heating at a voltage that is in a range of from 25 V to 30 V. In some embodiments, the warming base 102 is configured to provide induction heating at a voltage that is in a range of from 10 V to 25 V. In some embodiments, the warming base 102 is configured to provide induction heating at a voltage that is in a range of from 15 V to 25 V. In some embodiments, the warming base 102 is configured to provide induction heating at a voltage that is in a range of from 20 V to 25 V. In some embodiments, the warming base 102 is configured to provide induction heating at a voltage that is in a range of from 10 V to 20 V. In some embodiments, the warming base 102 is configured to provide induction heating at a voltage that is in a range of from 15 V to 20 V. In some embodiments, the warming base 102 is configured to provide induction heating at a voltage that is in a range of from 10 V to 15 V.

In some embodiments, the warming base 102 is configured to provide induction heating at a voltage that is in a range of from 18 V to 22 V. In some embodiments, the warming base 102 is configured to provide induction heating at a voltage that is in a range of from 19 V to 22 V. In some embodiments, the warming base 102 is configured to provide induction heating at a voltage that is in a range of from 20 V to 22 V. In some embodiments, the warming base 102 is configured to provide induction heating at a voltage that is in a range of from 21 V to 22 V. In some embodiments, the warming base 102 is configured to provide induction heating at a voltage that is in a range of from 18 V to 21 V. In some embodiments, the warming base 102 is configured to provide induction heating at a voltage that is in a range of from 19 V to 21 V. In some embodiments, the warming base 102 is configured to provide induction heating at a voltage that is in a range of from 20 V to 21 V. In some embodiments, the warming base 102 is configured to provide induction heating at a voltage that is in a range of from 18 V to 20 V. In some embodiments, the warming base 102 is configured to provide induction heating at a voltage that is in a range of from 19 V to 20 V. In some embodiments, the warming base 102 is configured to provide induction heating at a voltage that is in a range of from 18 V to 19 V.

In some embodiments, the warming base 102 is configured to provide induction heating at a power that is in a range of from 200 W to 300 W. In some embodiments, the warming base 102 is configured to provide induction heating at a power that is in a range of from 225 W to 300 W. In some embodiments, the warming base 102 is configured to provide induction heating at a power that is in a range of from 250 W to 300 W. In some embodiments, the warming base 102 is configured to provide induction heating at a power that is in a range of from 275 W to 300 W. In some embodiments, the warming base 102 is configured to provide induction heating at a power that is in a range of from 200 W to 275 W. In some embodiments, the warming base 102 is configured to provide induction heating at a power that is in a range of from 225 W to 275 W. In some embodiments, the warming base 102 is configured to provide induction heating at a power that is in a range of from 250 W to 275 W. In some embodiments, the warming base 102 is configured to provide induction heating at a power that is in a range of from 200 W to 250 W. In some embodiments, the warming base 102 is configured to provide induction heating at a power that is in a range of from 225 W to 250 W. In some embodiments, the warming base 102 is configured to provide induction heating at a power that is in a range of from 200 W to 225 W.

In some embodiments, the warming base 102 is configured to provide induction heating at a power that is in a range of from 260 W to 300 W. In some embodiments, the warming base 102 is configured to provide induction heating at a power that is in a range of from 270 W to 300 W. In some embodiments, the warming base 102 is configured to provide induction heating at a power that is in a range of from 280 W to 300 W. In some embodiments, the warming base 102 is configured to provide induction heating at a power that is in a range of from 290 W to 300 W. In some embodiments, the warming base 102 is configured to provide induction heating at a power that is in a range of from 260 W to 290 W. In some embodiments, the warming base 102 is configured to provide induction heating at a power that is in a range of from 270 W to 290 W. In some embodiments, the warming base 102 is configured to provide induction heating at a power that is in a range of from 280 W to 290 W. In some embodiments, the warming base 102 is configured to provide induction heating at a power that is in a range of from 260 W to 280 W. In some embodiments, the warming base 102 is configured to provide induction heating at a power that is in a range of from 270 W to 280 W. In some embodiments, the warming base 102 is configured to provide induction heating at a power that is in a range of from 260 W to 270 W.

In some embodiments, the inductive coil 160 has a diameter of 80 mm. In some embodiments, the inductive coil 160 has a diameter of 75 mm to 85 mm. In some embodiments, the inductive coil 160 has a diameter of 77 mm to 85 mm. In some embodiments, the inductive coil 160 has a diameter of 79 mm to 85 mm. In some embodiments, the inductive coil 160 has a diameter of 81 mm to 85 mm. In some embodiments, the inductive coil 160 has a diameter of 83 mm to 85 mm.

In some embodiments, the inductive coil 160 has a diameter of 75 mm to 83 mm. In some embodiments, the inductive coil 160 has a diameter of 75 mm to 81 mm. In some embodiments, the inductive coil 160 has a diameter of 75 mm to 79 mm. In some embodiments, the inductive coil 160 has a diameter of 75 mm to 77 mm.

In some embodiments, the inductive coil 160 has a diameter of 77 mm to 83 mm. In some embodiments, the inductive coil 160 has a diameter of 79 mm to 83 mm. In some embodiments, the inductive coil 160 has a diameter of 81 mm to 83 mm. In some embodiments, the inductive coil 160 has a diameter of 77 mm to 81 mm. In some embodiments, the inductive coil 160 has a diameter of 79 mm to 81 mm. In some embodiments, the inductive coil 160 has a diameter of 77 mm to 79 mm.

In some embodiments, the lead ends have a length of 8.8 mm. In some embodiments, the lead ends have a length of 8 mm to 10 mm. In some embodiments, the lead end have a length of 8.5 mm to 10 mm. In some embodiments, the lead ends have a length of 9 mm to 10 mm. In some embodiments, the lead ends have a length of 9.5 mm to 10 mm.

In some embodiments, the lead ends have a length of 8 mm to 9.5 mm. In some embodiments, the lead ends have a length of 8 mm to 9 mm. In some embodiments, the lead ends have a length of 8 mm to 8.5 mm.

In some embodiments, the lead ends have a length of 8.2 mm to 9.2 mm. In some embodiments, the lead ends have a length of 8.4 mm to 8.6 mm. In some embodiments, the lead ends have a length of 9.4 mm to 9.8 mm. In some embodiments, the lead ends have a length of 8.8 mm to 9.6 mm. In some embodiments, the lead ends have a length of 8.6 mm to 9.6 mm.

In some embodiments, the warming base 102 is configured to heat fluid in the bottle 104 to a temperature of 98.6° F. In some embodiments the warming base 102 is configured to heat fluid in the bottle 104 to a temperature of 95° F. to 110° F. In some embodiments the warming base 102 is configured to heat fluid in the bottle 104 to a temperature of 100° F. to 110° F. In some embodiments the warming base 102 is configured to heat fluid in the bottle 104 to a temperature of 105° F. to 110° F.

In some embodiments the warming base 102 is configured to heat fluid in the bottle 104 to a temperature of 95° F. to 105° F. In some embodiments the warming base 102 is configured to heat fluid in the bottle 104 to a temperature of 95° F. to 100° F.

In some embodiments the warming base 102 is configured to heat fluid in the bottle 104 to a temperature of 95° F. to 98° F. In some embodiments the warming base 102 is configured to heat fluid in the bottle 104 to a temperature of 98° F. to 102° F. In some embodiments the warming base 102 is configured to heat fluid in the bottle 104 to a temperature of 104° F. to 108° F.

In some embodiments, the warming base 102 is configured to heat fluid within the bottle 104 to a temperature of 108° F. within 2 to 5 minutes. In some embodiments, the warming base 102 is configured to heat fluid within the bottle 104 to a temperature of 108° F. within 3 to 5 minutes. In some embodiments, the warming base 102 is configured to heat fluid within the bottle 104 to a temperature of 108° F. within 4 to 5 minutes. In some embodiments, the warming base 102 is configured to heat fluid within the bottle 104 to a temperature of 108° F. within 2 to 4 minutes. In some embodiments, the warming base 102 is configured to heat fluid within the bottle 104 to a temperature of 108° F. within 2 to 3 minutes. In some embodiments, the warming base 102 is configured to heat fluid within the bottle 104 to a temperature of 108° F. within 3 to 4 minutes.

In some embodiments, the warming base 102 may include at least one pressure sensor 154 that are configured to determine the weight of the bottle warming system 100 including the warming base 102 and the bottle 104 positioned thereon. In some embodiments, the at least one pressure sensor 154 are integrated into a bottom surface of the warming base 102 such that the entire bottle warming system 100 sits thereon. In some embodiments, the at least one pressure sensor 154 can measure a weight (e.g., ounces, pounds, grams, kilograms, etc.) of the bottle 104 and the warming base 102 when the bottle 104 is placed on the warming base 102. In some embodiments, the at least one pressure sensor 154 may include a strain gauge. In some embodiments, the at least one pressure sensor 154 may include a capacitive force sensor. In some embodiments, the at least one pressure sensor 154 may be located in any suitable location on the bottom surface of the warming base 102 where they can be exposed to a force coinciding with the placement of the bottle 104 on the warming base 102. In some embodiments, the at least one pressure sensor 154 may be substantially aligned with a center axis (e.g., axis of symmetry) of the warming base 102. In other embodiments, the at least one pressure sensor 154 may be substantially unaligned with the center axis (e.g., off center relative to an axis of symmetry) of the warming base 102.

Figure 11:
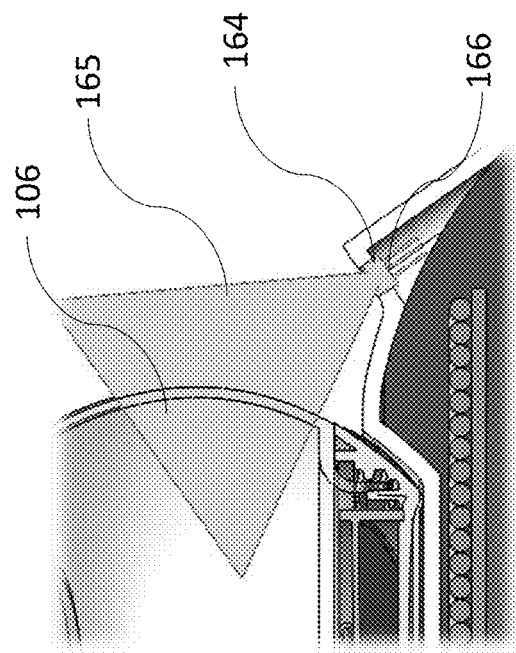
FIG. 11 is a cross-sectional view of the infrared sensor, according to embodiments of the present disclosure.
Figure 10:
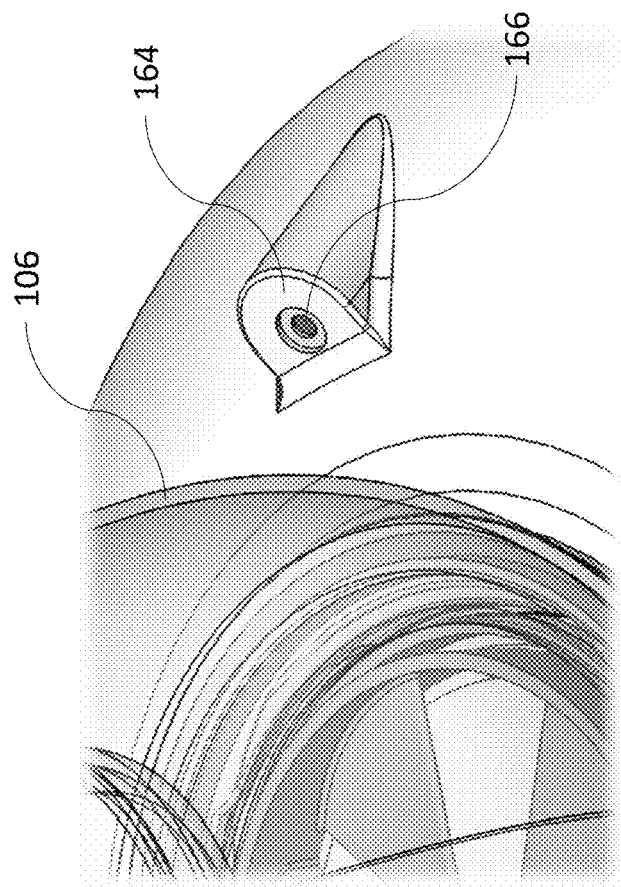
FIG. 10 is a perspective view of an infrared sensor of the warming base, according to embodiments of the present disclosure.

In some embodiments, the warming base 102 includes at least one infrared sensor 164 configured to measure a temperature of a volume of liquid within the bottle 104. In some embodiments, the at least one infrared sensor 164 is positioned on one side of the recess 150 and angled so that an infrared beam 165 generated by the infrared sensor 164 is directed to the fluid reservoir 106 to measure a temperature of the volume of liquid therein, as depicted in FIGS. 7, 10 and 11. In some embodiments, the infrared sensor 164 may detect when the liquid within the fluid reservoir 106 reaches a threshold temperature (e.g., a predetermined temperature) and signal the warming base 102 to alert a user that the bottle 104 is ready for feeding. In some embodiments, the infrared sensor 164 may detect that the liquid within the fluid reservoir 106 exceeds a threshold temperature (e.g., a predetermined temperature) and signal the warming base 102 to discontinue application of electrical current to the inductive coil 160. In some embodiments, the infrared sensor 164 may be a thermal infrared temperature sensor or a far infrared temperature sensors. Due to the relatively fixed position and distance between the infrared sensor 164 and the bottle 104 to be measured, the temperature measurement is more stable and reliable than the traditional handheld infrared thermometer, and is more convenient to use.

In some embodiments, the warming base 102 may include an internal power source such as at least one battery (not shown). In some embodiments, the warming base 102 includes two, three or four batteries. In some embodiments, the at least one battery is a Lithium-Ion battery. In some embodiments, the at least one battery is a 18650 Lithium-Ion battery. In some embodiments, the internal power source is configured to store enough power for three to five heating cycles. In other embodiments, the at least one battery is a rechargeable battery pack. In some embodiments, the warming base may include a USB type-C port for charging the battery pack. In some embodiments, the USB type-C port may be used for either 110 V or 220 V outlets to recharge the rechargeable battery pack. In some embodiments, the USB type-C port is capable of supplying approximately 200 W of output. In some embodiments, the warming base 102 may also be connected to a power supply source through a mains plug connected via the USB type-C port. In alternative embodiments, the warming base 102 may include a plurality of adaptors/power sources to receive various power supplies according to the circumstances of the user. For example, in some embodiments, the warming base 102 includes a power supply input (e.g., a three-prong input suitable to be coupled to a standard electrical outlet) instead of, or in addition to, a USB type-C port as described above. In some embodiments, the warming base 102 may include an overcharge protection circuit to ensure that the at least one battery will not be damaged if the warming base 102 is connected to a power source for longer than needed to charge the at least one battery.

In some embodiments, the warming base 102 includes a printed circuit board (PCB) that may include a processor or microcontroller unit (MCU) and/or a computer readable medium (e.g., memory) mounted thereon. In some embodiments, the processor may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

In some embodiments, the warming base 102 includes a user interface 156 that communicates with the processor. In some embodiments, the user interface 156 may include a dot matrix display. In some embodiments, the dot matrix display may act as a mechanical switch to cycle through a number of functions of the bottle warming system 100 while being relatively inexpensive to manufacture. In some embodiments, by pushing on a clear lens 158 covering the dot matrix display, small movements trigger a small mechanical switch underneath the dot matrix display, reducing the number of controls on the warming base 102. Reducing the controls number allows for easy operation during, for example, early morning feedings.

Figure 14:
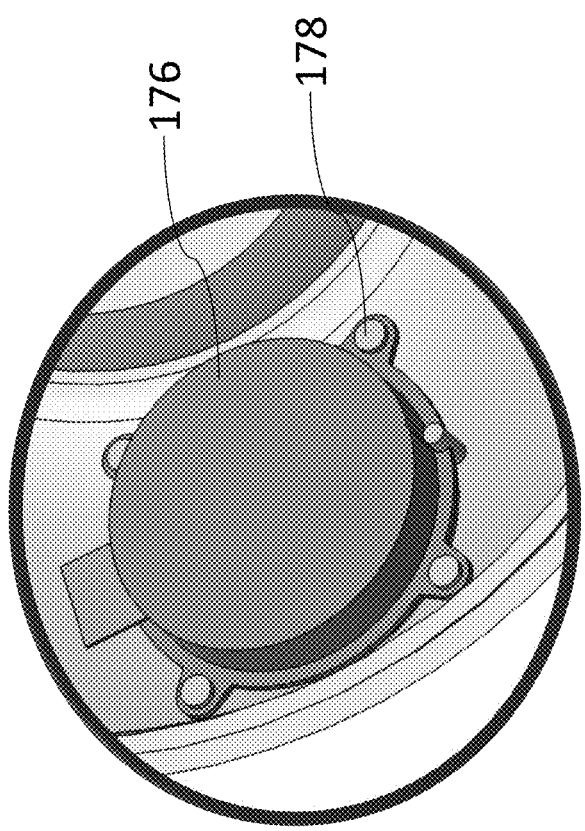
FIG. 14 is a bottom view of the user interface of the warming base, according to embodiments of the present disclosure.

In some embodiments, as depicted in FIGS. 12-14, the user interface 156 includes an LCD button 166 with a clear lens 158. In some embodiments, the LCD button 166 may include an overmolded silicon lining 168 for fitting and sealing of the LCD button 166 within a top shell 170 of the warming base 102. In some embodiments, the user interface 156 also includes an LCD 172 adjacent the LCD button 166 and a tact switch 174 adjacent the LCD 172. In some embodiments, the tact switch 174 is positioned on a switch carrier 176, which, in some embodiments, is attached to the top shell 170 via at least one heatstake 178. In some embodiments, the user interface 156 may include one or more of: a digital screen, a visual indicator, an indicator light, a capacitive touch sensor, a gesture sensor, etc. In some embodiments, the warming base 102 can also include one or more timers that communicate time information to the MCU.

In some embodiments, the user interface 156 may also include an LED indicator light configured to indicate various states of the system 100. For example, in some embodiments, the different states indicated by the LED light may include "dormant", "in use", "ready", "set up" and/or "error." In some embodiments, different states may be indicated by changes in color of the LED light or by changes in duration (i.e., steady, blinking, etc.).

In some embodiments, a user 190 may actuate the heating of the contents in the fluid reservoir 106 by providing a "start heating" instruction to the warming base 102. For example, the user 190, in some embodiments, may actuate (e.g., touch, press, push, gesture at) the user interface 156 of the warming base 102 to deliver power to the heat plate 118 in the bottle lid assembly 110 (e.g., via the inductive coil 160 in the warming base 102). Further, in some embodiments, the user 190 may select a temperature setpoint or temperature range to which the contents of the fluid reservoir 106 are to be heated via the user interface 156 of the warming base 102. In some embodiments, the user 190 may additionally provide the "start heating" instruction and user-selected temperature setpoint or temperature range to the warming base 102 wirelessly via, for example, a remote electronic device 180, as will be described in further detail below.

In some embodiments, the bottle warming system 100 may be programmed to heat (e.g., automatically without user actuation) liquid at specific time(s) of day (e.g., based on collected data of feeding patterns of infant). For example, in some embodiments, a user may program future heating times for the infant bottle (e.g., drinkware container) using the electronic device 180 via the wireless communication between the warming base 102 and the mobile electronic device 180. In some embodiments, the warming base 102 may then deliver heat to the bottle 104 at the programmed time so long as the bottle 104 is on the warming base 102 (e.g., if the at least one pressure sensor 154 signals to the PCB that the bottle 104 is on the warming base 102) and so long as the PCB indicates the presence of liquid in the bottle 104.

In some embodiments, the at least one pressure sensor 154 may sense a weight of liquid in the fluid reservoir 106 by subtracting a known weight of the empty bottle 104 from the weight of the bottle 104 with liquid. In some embodiments, the at least one pressure sensor 154 may communicate the sensed information to the warming base 102 (e.g., to the PCB), as discussed above. In some embodiments, the warming base 102 may then calculate a volume of liquid based on the sensed weight (e.g., using information stored on the computer readable medium (e.g., memory) on the size of the fluid reservoir 106 in the bottle 104).

In some embodiments, the warming base 102 may store information on the volume of liquid consumed in any feeding, as well as the time the feeding began and the duration of the feeding period. For example, in some embodiments, when a heating operation of the liquid in the bottle 104 is started, the warming base 102 may log the start volume (e.g., the calculated volume) of the liquid. Once the heating process is completed, the bottle 104 may be removed from the warming base 102 and the infant is fed the contents of the bottle 104. Upon completion of the feeding session, the user may place the bottle 104 back onto the warming base 102, at which point the warming base 102 may again log the end volume (e.g., calculated volume) of the liquid in the bottle 104 and the warming base 102 can calculate the volume consumed by the infant (e.g., by subtracting the end volume from the start volume).

In some embodiments, the warming base 102 may include one or more antennae that communicate with a transceiver and optionally implement a wireless telecommunication standard (e.g., WiFi 802.11, 3G, BLUETOOTH®). In some embodiments, a transceiver or antennae may be mounted on the PCB. In some embodiments, the transceiver may generate wireless signals for transmission via the antenna. In some embodiments, the transceiver may receive incoming wireless signals via the antenna. It will be understood that various functionalities associated with transmitting and receiving of wireless (e.g., RF) signals can be achieved by one or more components represented by a single transceiver. For example, in some embodiments, a single component may be configured to provide both transmitting and receiving functionalities. In another example, transmitting and receiving functionalities can be provided by separate components.

In some embodiments, operation of the warming base 102 may be controlled via an electronic device 180 (e.g., mobile electronic device such as a smartphone, tablet computer, etc.) that communicates a signal wirelessly to the warming base 102. In some embodiments, wireless circuitry may be used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry may use various protocols, e.g., as described herein.

Figure 15:
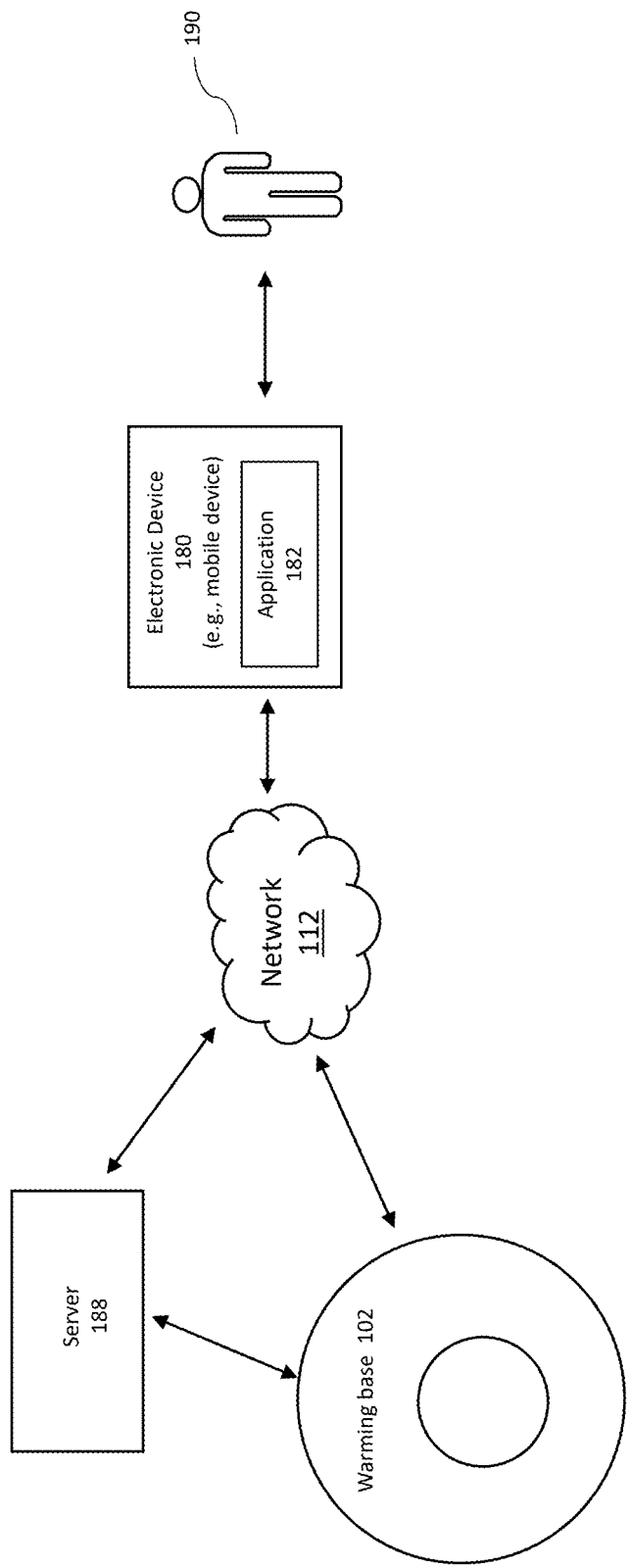
FIG. 15 is a block diagram illustrating an exemplary communication system of the bottle warming system, according to embodiments of the present disclosure.

With reference to FIG. 15, as discussed above, in some embodiments, the warming base 102 may be configured to communicate (e.g., one-way communication, two-way communication) with one or more remote electronic devices 180 (e.g., mobile phone, tablet computer, desktop computer) of a user 190 via a wired or wireless connection (e.g., 802.11b, 802.11a, 802.11 g, 802.11n standards, 3G, 4G, LTE, BLUETOOTH®, etc.). In some embodiments, the warming base 102 may communicate with a cloud-based data storage system or server 188, via one or both of a wired or wireless connection (e.g., 802.11b, 802.11a, 802.11 g, 802.11n standards, 3G, 4G, LTE, etc.). In some embodiments, the warming base 102 may communicate with the remote electronic device 180 via a mobile application software 182 (e.g., an "app") that is optionally downloaded (e.g., from an app store, from the cloud, from a server maintained by a developer of the mobile application software 182, etc.) onto the remote electronic device 180. In some embodiments, the mobile application software 182 may provide a graphical user interface via which the remote electronic device 180 may display one or more data received from the warming base 102 and/or information transmitted from the remote electronic device 180 to the warming base 102. In some embodiments, the user 190 may provide instructions to the warming base 102 via the graphical user interface on the remote electronic device 180 (e.g., temperature setpoint at which to heat the contents of the bottle 104, starting or stopping heating of the contents of the bottle 104, etc.). In some embodiments, the mobile application software 182 may have the ability to store all of the data provided to the user by the warming base 102 via the server CL.

In some embodiments, the remote electronic device 180 may be a mobile electronic device, such as smartphone or tablet computer, which can communicate with the warming base 102 via, for example WiFi or BLUETOOTH®. In some embodiments, the remote electronic device 180 may be a voice activated intelligent personal assistant (e.g., ALEXA™ by AMAZON®) device that can communicate with the warming base 102, for example via WiFi. Accordingly, in an additional or alternative implementation, the operation of the warming base 102, and therefore the operation of the heating or cooling of the contents of the bottle 104, may be effected via wireless instructions received from the remote electronic device 180 (e.g., received via voice activation of an intelligent personal assistant that communicates with the warming base 102).

In some embodiments, the graphical user interface on the remote electronic device 180 may provide a dashboard display of one or more parameters associated with the use of the warming base 102. For example, in some embodiments, the GUI may provide an indication of power supply left in the one or more batteries, such as % of life left or time remaining before battery power drains completely, temperature in bottle 104. In some embodiments, the warming base 102 may communicate information (e.g., a temperature of the contents in the bottle 104, a start time of a feeding event, an end time of a feeding event, a duration of a feeding event, the number of feeding events per day, an amount, for example volume, consumed during a feeding event) to the cloud on a periodic basis (e.g., every hour, one a day, on a continuous basis in real time, etc.). For example, in some embodiments, the start time of a feeding event can substantially coincide with the time the bottle 104 is removed from the warming base 102 after the alert has been sent to the user (e.g., wirelessly sent to the remote electronic device 180) that the desired temperature of the contents in the fluid reservoir 106 of the bottle 104 has been reached. In some embodiments, the end time of a feeding event can substantially coincide with the time the bottle 104 is placed back on the warming base 102 after a start time has been logged by the warming base 102. In some embodiments, a duration of the feeding event may be calculated based on the difference between the end time and start time logged by the warming base 102. In some embodiments, the number of feedings may be calculated based on the number of start times logged and/or number of end times logged in a twenty-four hour period. In some embodiments, the amount (e.g., volume) consumed in a feeding event may be calculated based on the difference in the measured weight of the bottle 104 at the logged start time and the measured weight at the logged end time for a feeding event.

In some embodiments, once stored on the cloud, such information may be accessed via the remote electronic device 180 (e.g., via a dashboard on a smart phone, tablet computer, laptop computer, desktop computer, etc.), advantageously allowing, for example, the user 190 to track the number of feeding events and/or timing of feeding events and/or amounts consumed by an infant. In some embodiments, such information may be communicated (e.g., via a push notification) from the cloud to the remote electronic device 180. In some embodiments, the dashboard may allow a user to view and compare (e.g., in bar chart form, pie chart form, etc.) infant feeding events during a period selected by the user (e.g., day to day, over a week, week-to-week, over a month, etc.). Additionally, in some embodiments, the warming base 102 may store in a memory such information, which can be accessed from the warming base 102 by the user 190 via the wired or wireless connection (e.g., via the remote electronic device 180). This ability to store all feeding data on the cloud may allow the user to have a full record of parameters of each feeding. In some embodiments, the data is stored on the cloud until the user decides to delete it. In some embodiments, the mobile application software 182 may be configured to organize the stored data to create trend charts and summaries to provide feedback to the user, helping the user to monitor the health and growth of the infant. In some embodiments, the mobile application software 182 allows each caregiver to monitor their specific feedings. For example, the mobile application software 182 may separately monitor and record parameters of feedings performed by the infant's mother, father, grandparents, babysitters, etc. Such tracking may help to ensure consistent feeding performance by various caregivers. Such communication with one or both of the remote electronic device 180 and the cloud-based data storage system or server makes the warming base 102 a smart base.

In some embodiments, the warming base 102 may provide one or more alerts (e.g., visual alerts, aural alerts) to a user via one or both of the user interface 156 on the warming base 102 and the remote electronic device 180. In some embodiments, the alerts may include at least one of: instructions to place the empty bottle 104 on the warming base 102 to record an initial weight (empty) of the bottle 104 without liquid; instructions to place the bottle 104 (once filled with liquid) on the warming base 102 to record an initial weigh-in and/or to start a heating process of the contents in the bottle 104; instructions to remove the bottle 104 from the warming base 102 once the temperature setpoint for the contents in the bottle 104 is reached; recording a feeding start time once the bottle 104 is removed; instructions to place the bottle 104 on the warming base 102 to record an end weigh-in after bottle 104 was removed; recording a feeding end time once the bottle 104 is replaced on the warming base 102; or battery power available.

In use, a liquid may be inserted into the bottle 104 and the bottle lid assembly 110, with the heat plate and, in some embodiments, the turbine-shaped retainer 120 is fastened to the neck portion 108 of the bottle 104. In some embodiments, the bottle 104 is then turned such that top wall 126 of the main lid 122 is facing downwards, so that the heat plate 118 comes into direct contact with the liquid within the bottle 104, irrespective of how much liquid is in the bottle 104. The bottle 104 may then be mounted in the warming base 102 such that the bottle lid assembly 110 is received in the recess 150, with the top wall 126 of the main lid 122 adjacent to the recess floor 152. The warming base 102 may then be instructed, via the user interface 156 or the mobile application software 182 on the electronic device 180, to begin heating the liquid.

Accordingly, in use, the liquid comes into direct contact with the first surface 124 of the heat plate 118, which is heat via the inductive coil 160 in the warming base 102, and heats up the liquid. This heating of the heat plate 118 results in direct heat transfer from the heat plate 118 to the liquid. Also, due to the rotational symmetry of the bottle lid assembly 110 and the recess 150 of the warming base 102, the bottle 104 may be received in the recess 150 of the warming base 102 in any rotational configuration about an axis of the bottle 104.

Figure 16:
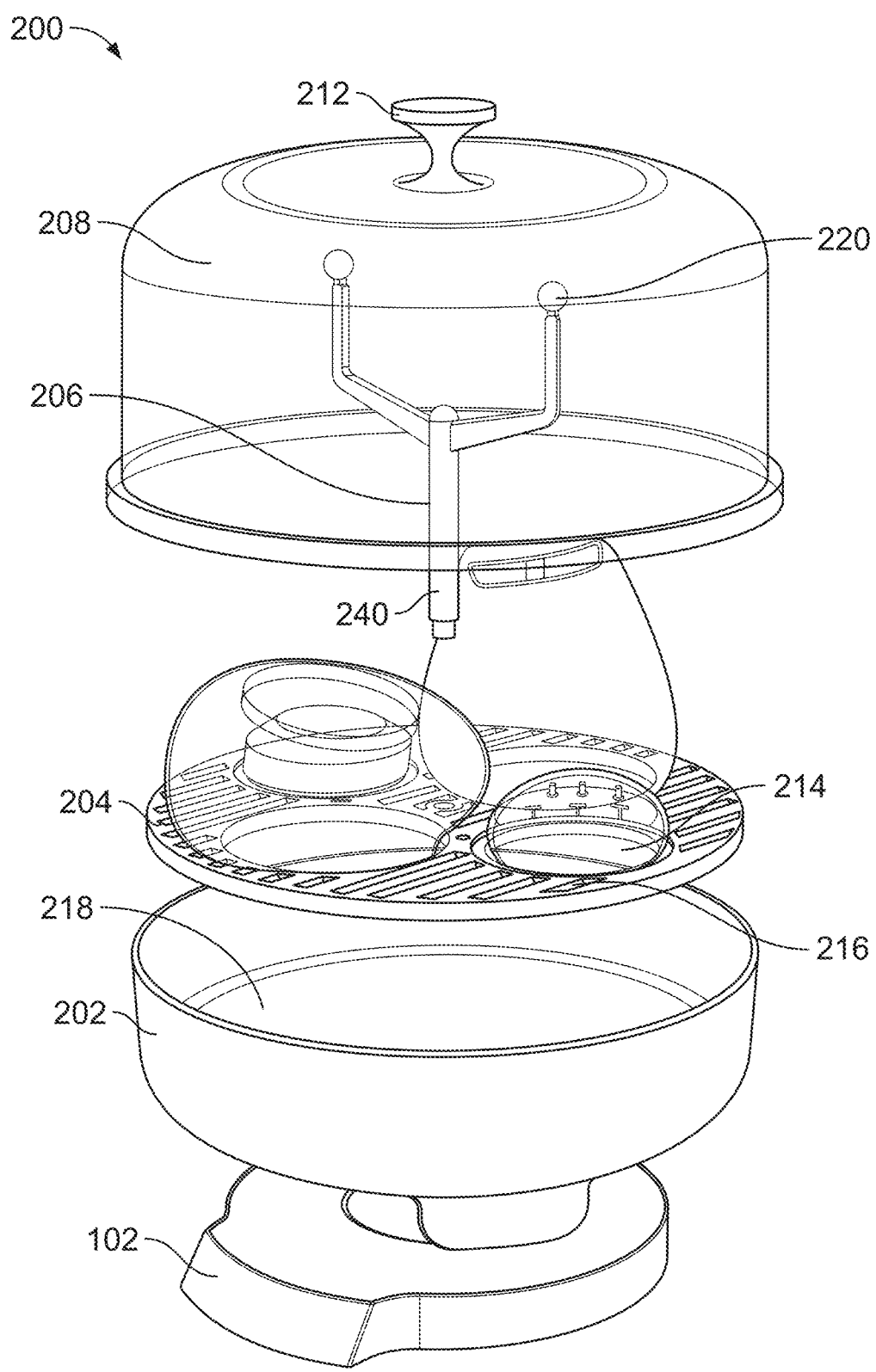
FIG. 16 is an exploded view of a steaming system, according to embodiments of the present disclosure.

FIG. 16 depicts a steaming system 200 for sterilizing objects in accordance with embodiments of the present disclosure. In some embodiments, the steaming system 200 incorporates the warming base 102 therein to generate steam for sterilization. Specifically, in some embodiments, a steamer base 202 may be positioned on top of the warming base 102 such that the induction heating system of the warming base 102 may be used to sterilize baby products such as, for example, baby bottles, nipples, pacifiers, etc. In some embodiments, the steaming system 200 includes the steamer base 202, a tray 204, a support structure 206 and a cover 208.

Figure 17:
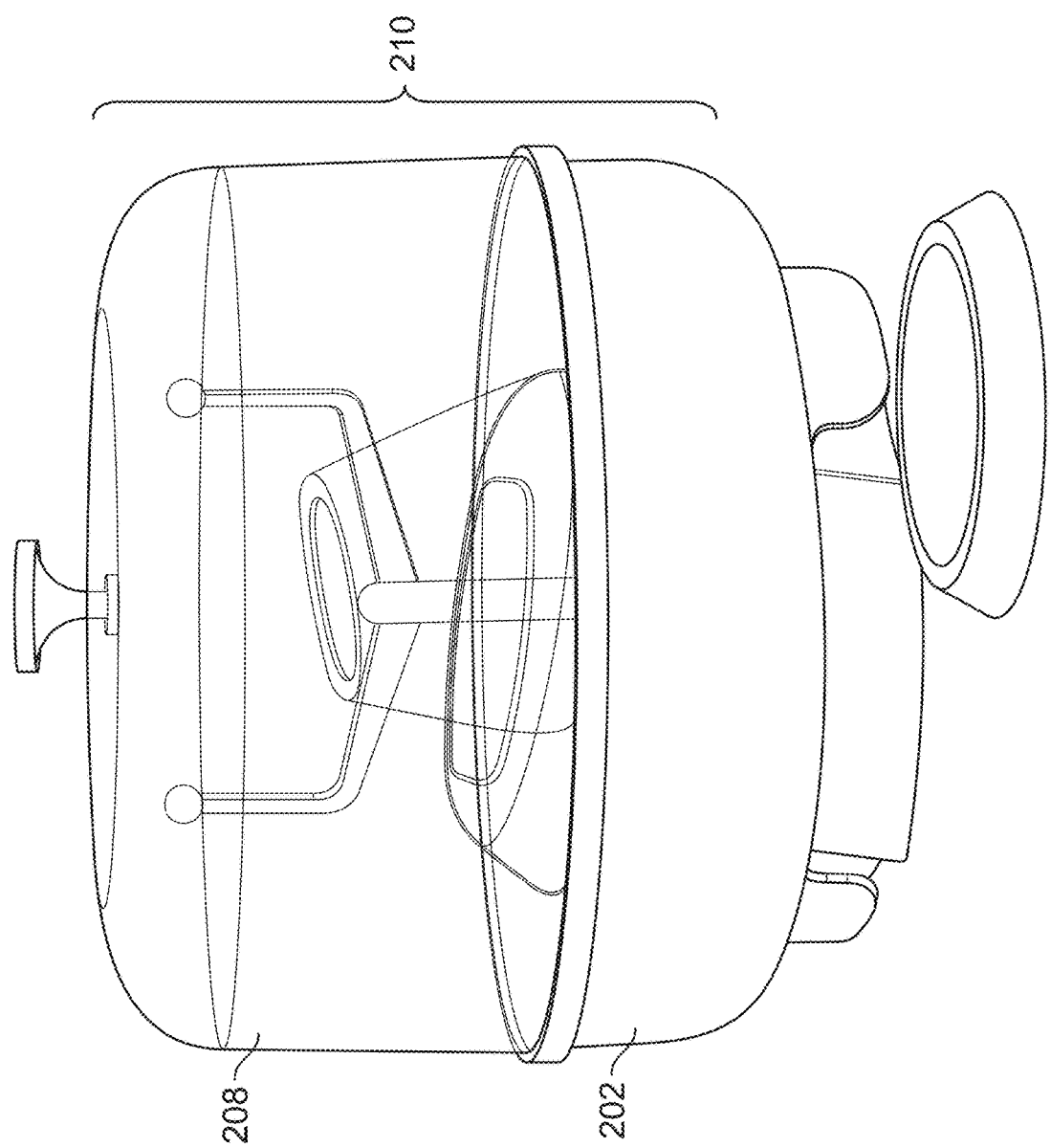
FIG. 17 is a perspective view of the steaming system, according to embodiments of the present disclosure.

In some embodiments, the cover 208 is positioned on the steamer base 202 to define a fluid-tight sterilization chamber 210 between the cover 208 and the steamer base 202, into which objects to be sterilized may be placed. In some embodiments, the cover 208 may be made from a transparent or translucent material so that the user can see objects being sterilized withing the steaming system 200, as depicted in FIGS. 16-17. In some embodiments, the cover 208 may be opaque. In some embodiments, a handle 212 is positioned on top of the cover 208 for use in separating the cover 208 from the steamer base 202. In some embodiments, the cover 208 includes a curved upper portion to help direct air and steam within the sterilization chamber 210.

In some embodiments, the steamer base 202 may be bowl-shaped so as to retain water therein for creation of steam for sterilization, as depicted in FIG. 16. In some embodiments, the steamer base 202 may be any other shape, so long as the steamer base 202 is positionable on the warming base 102 and is able to hold water therein. In some embodiments, the steamer base 202 includes a heat plate 218 configured to be positioned at the bottom of the steamer base 202. In some embodiments, the heat plate 218 may be retained at the bottom of the steamer base 202 via a circumferential lip (not shown) extending inwardly from an interior wall of the steamer base 202 into an interior space of the steamer base 202. Alternatively, in some embodiments, the interior wall may include any other internal retaining feature configured to retain the heat plate 218 at the bottom of the steamer base 202. In some embodiments, the steamer base 202 comprises a silicone liner. In some embodiments, the silicone liner facilitates cleaning of the steamer base 202. In some embodiments, the silicone liner provides thermal insulation such that the exterior of the steamer base 202 is not too hot to be touched during use.

Figure 18:
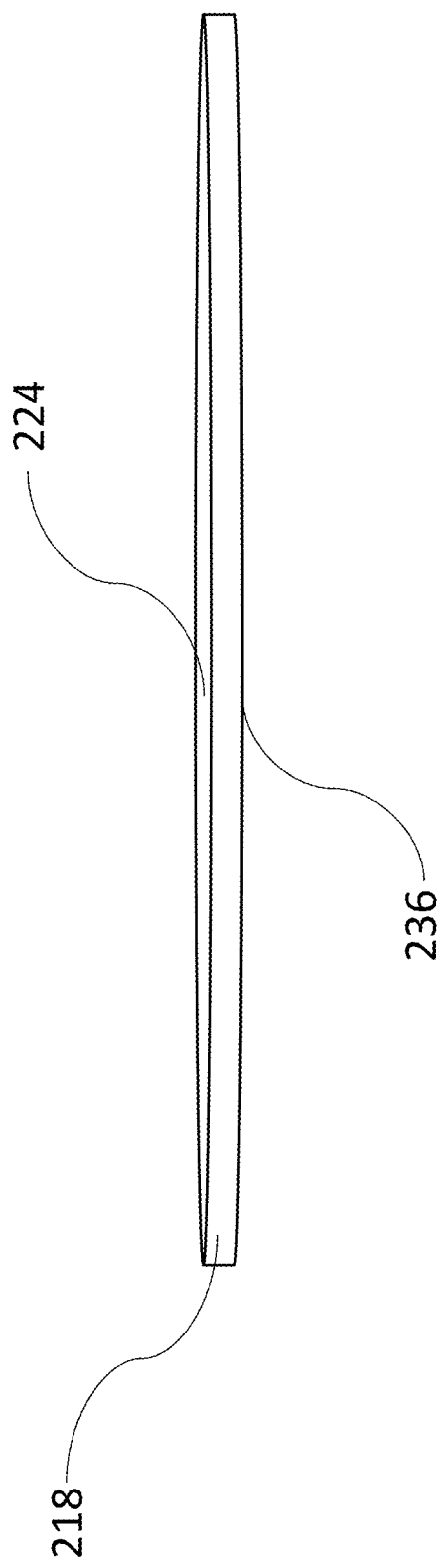
FIG. 18 is a side view of a heat plate of the steaming system, according to embodiments of the present disclosure.

In some embodiments, as depicted in FIG. 18, the heat plate 218 is generally disc-shaped including a first surface 224 configured to contact fluid within the bottle and an opposite second surface 236 positioned adjacent to an interior surface of the steamer base 202. In some embodiments, the heat plate 218 is formed of metal suitable for induction heating. For example, in some embodiments, the heat plate 218 may include a ferrous material such as iron or steel. In some embodiments, the heat plate 218 is configured to be excited and heated by an inductive heating coil in the warming base 102. In turn, in some embodiments, the heat plate 218 heats the water in contact with the first surface 224 thereof. As the heat plate 218 warms, the water located in the steamer base 202 is heated sufficiently so as form steam within the sterilization chamber 210.

In some embodiments, the heat plate 218 has an outer diameter of 59.5 mm. In some embodiments, the heat plate 218 has an outer diameter of 55 mm to 65 mm. In some embodiments, the heat plate 218 has an outer diameter of 57 mm to 65 mm. In some embodiments, the heat plate 218 has an outer diameter of 59 mm to 65 mm. In some embodiments, the heat plate 218 has an outer diameter of 61 mm to 65 mm. In some embodiments, the heat plate 218 has an outer diameter of 63 mm to 65 mm.

In some embodiments, the heat plate 218 has an outer diameter of 55 mm to 63 mm. In some embodiments, the heat plate 218 has an outer diameter of 55 mm to 61 mm. In some embodiments, the heat plate 218 has an outer diameter of 55 mm to 59 mm. In some embodiments, the heat plate 218 has an outer diameter of 55 mm to 57 mm.

In some embodiments, the heat plate 218 has an outer diameter of 57 mm to 63 mm. In some embodiments, the heat plate 218 has an outer diameter of 57 mm to 61 mm. In some embodiments, the heat plate 218 has an outer diameter of 57 mm to 59 mm. In some embodiments, the heat plate 218 has an outer diameter of 59 mm to 63 mm. In some embodiments, the heat plate 218 has an outer diameter of 59 mm to 61 mm. In some embodiments, the heat plate 218 has an outer diameter of 61 mm to 63 mm.

In some embodiments, the heat plate 218 has an outer diameter of 30 mm to 65 mm. In some embodiments, the heat plate 218 has an outer diameter of 35 mm to 65 mm. In some embodiments, the heat plate 218 has an outer diameter of 40 mm to 65 mm. In some embodiments, the heat plate 218 has an outer diameter of 45 mm to 65 mm. In some embodiments, the heat plate 218 has an outer diameter of 50 mm to 65 mm. In some embodiments, the heat plate 218 has an outer diameter of 30 mm to 60 mm. In some embodiments, the heat plate 218 has an outer diameter of 35 mm to 60 mm. In some embodiments, the heat plate 218 has an outer diameter of 40 mm to 60 mm. In some embodiments, the heat plate 218 has an outer diameter of 45 mm to 60 mm. In some embodiments, the heat plate 218 has an outer diameter of 50 mm to 60 mm.

In some embodiments, the heat plate 218 has an outer diameter of 30 mm to 55 mm. In some embodiments, the heat plate 218 has an outer diameter of 35 mm to 55 mm. In some embodiments, the heat plate 218 has an outer diameter of 40 mm to 55 mm. In some embodiments, the heat plate 218 has an outer diameter of 45 mm to 55 mm. In some embodiments, the heat plate 218 has an outer diameter of 50 mm to 55 mm. In some embodiments, the heat plate 218 has an outer diameter of 30 mm to 50 mm. In some embodiments, the heat plate 218 has an outer diameter of 35 mm to 50 mm. In some embodiments, the heat plate 218 has an outer diameter of 40 mm to 50 mm. In some embodiments, the heat plate 218 has an outer diameter of 45 mm to 50 mm. In some embodiments, the heat plate 218 has an outer diameter of 30 mm to 45 mm. In some embodiments, the heat plate 218 has an outer diameter of 35 mm to 45 mm. In some embodiments, the heat plate 218 has an outer diameter of 40 mm to 45 mm. In some embodiments, the heat plate 218 has an outer diameter of 30 mm to 40 mm. In some embodiments, the heat plate 218 has an outer diameter of 35 mm to 40 mm. In some embodiments, the heat plate 218 has an outer diameter of 30 mm to 35 mm.

In some embodiments the heat plate 218 has a thickness (i.e., a dimension extending between the first surface 224 and the second surface 236) of 1 mm to 2 mm. In some embodiments, the heat plate 218 has a thickness of 1 mm to 1.8 mm. In some embodiments, the heat plate 218 has a thickness of 1 mm to 1.6 mm. In some embodiments, the heat plate 218 has a thickness of mm to mm. In some embodiments, the heat plate 218 has a thickness of 1 mm to 1.4 mm. In some embodiments, the heat plate 218 has a thickness of 1 mm to 1.2 mm.

In some embodiments, the heat plate 218 has a thickness of 1.2 mm to 2 mm. In some embodiments, the heat plate 218 has a thickness of 1.2 mm to 1.8 mm. In some embodiments, the heat plate 218 has a thickness of 1.2 mm to 1.6 mm. In some embodiments, the heat plate 218 has a thickness of 1.2 mm to 1.4 mm.

In some embodiments, the heat plate 218 has a thickness of 1.4 mm to 2 mm. In some embodiments, the heat plate 218 has a thickness of 1.4 mm to 1.8 mm. In some embodiments, the heat plate 218 has a thickness of 1.4 mm to 1.6 mm. In some embodiments, the heat plate 218 has a thickness of 1.6 mm to 2 mm. In some embodiments, the heat plate 218 has a thickness of 1.6 mm to 1.8 mm. In some embodiments, the heat plate 218 has a thickness of 1.8 mm to 2 mm.

In some embodiments, the tray 204 is positioned on an upper portion of the steamer base 202. In some embodiments, the tray 204 is retained in position by a retaining structure (not shown), such as, for example, at least two projections from an interior wall of the steamer base 202, a retaining lip, etc. The tray 204 may be a support structure to support objects (e.g., bottles, nipples, pacifiers, etc.) within the sterilization chamber 210. In some embodiments, the tray 204 includes at least one large opening 214 in which a bottle may be positioned. In some embodiments, a bottle may be positioned upside down in the at least one large opening 214 for more stability. In some embodiments, the tray 204 may also include at least one small opening 216 (e.g., a slot) which allows the passage of steam and air through the tray 204 so as to reach objects positioned above the tray 204.

In some embodiments, the tray may include a support structure 206 extending up from the tray 204. In some embodiments, the support structure 206 includes at least two prongs 220 extending from a support structure base 240. In some embodiments, smaller components may be placed on each of the two prongs 220 for sterilization. Thus, the support structure 206 allows are additional objects to be sterilized during one sterilization cycle.

In some embodiments, the steaming system 200 may be controlled via the user interface 156 in accordance with the description provided above with regard to the warming base 102. In some embodiments, operation of the steaming system 200 may be controlled via the electronic device 180 (e.g., mobile electronic device such as a smartphone, tablet computer, etc.) in accordance with the description provided above with regard to the warming base 102. For example, in some embodiments, the user interface 156 or the electronic device 180 may instruct the steaming system 200 to start or stop steaming. Additionally, the user interface 156 or the electronic device 180 may control steaming settings such as duration, heat level, etc.

In some embodiments, in use, the steaming system 200 is placed on top of the warming base 102. Water is then poured into the steamer base 202 by the user. Additionally, objects to be sterilized are placed on the tray 204 and/or the support structure 206 and the cover 208 is positioned on the steamer base 202. Once the steaming system 200 is turned on, the heat plate 218 is heated, via induction heating, by the warming base 102. In turn, the water within the steamer is heated by the heat plate 218, creating steam, which passes up through the small openings 216 in the tray 204, into the sterilization chamber 210 and around the objects within the sterilization chamber 210, thereby sterilizing the objects.

Figure 19:
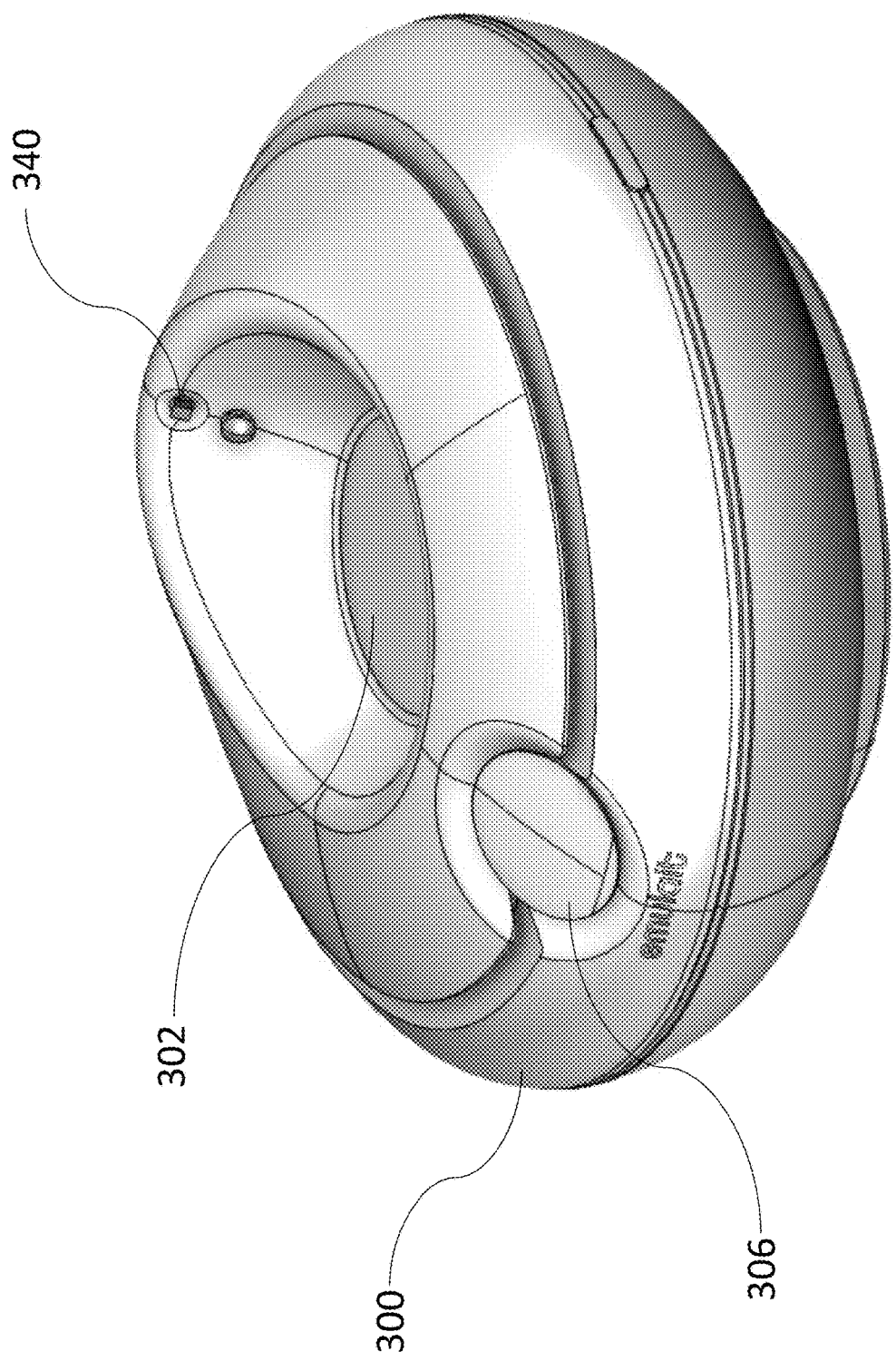
FIG. 19 is a front perspective view of an embodiment of a warming base, according to embodiments of the present disclosure.
Figure 20:
FIG. 20 is a rear perspective view of the embodiment of a warming base shown in FIG. 19.
Figure 21:
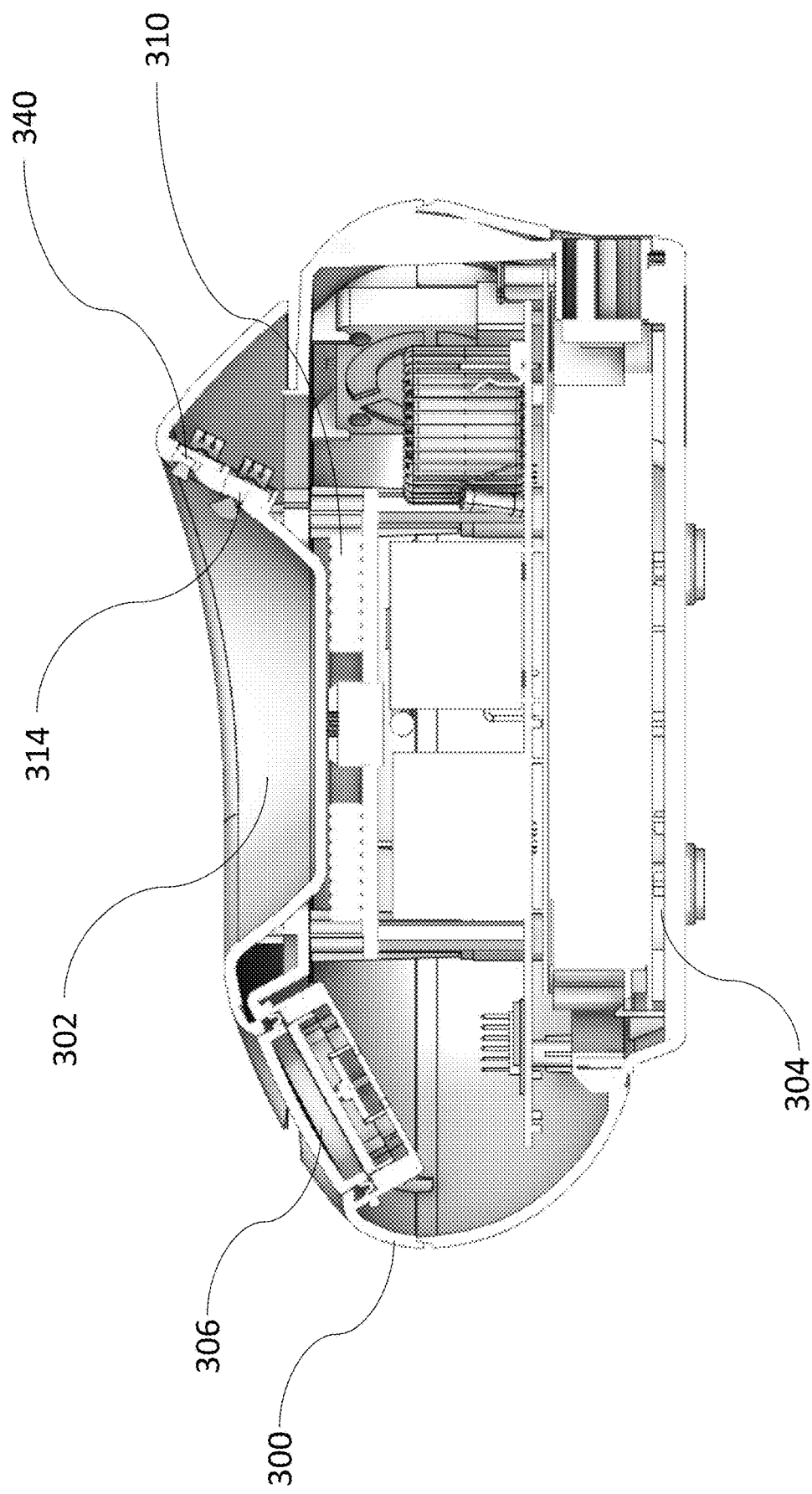
FIG. 21 is a section view of the embodiment of a warming base shown in FIG. 19.

FIGS. 19-21 show another embodiment of a warming base 300. FIG. 19 shows a front perspective view of the warming base 300, FIG. 20 shows a rear perspective view of the warming base 300, and FIG. 21 shows a section view of the warming base 300.

In some embodiments, the warming base 300 is substantially similar to the warming base 102 described above (e.g., includes substantially the same elements and operates in substantially the same manner) other than as described hereinafter. For example, as a non-exclusive list, in some embodiments, the warming base 300 includes a recess 302 that is substantially similar to the recess 150, at least one pressure sensor 304 that is substantially similar to the at least one pressure sensor 154, a user interface 306 that is substantially similar to the user interface 156, an inductive coil 310 that is substantially similar to the inductive coil 160, and an infrared sensor 314 that is substantially similar to the infrared sensor 164, each of which operates in substantially the same manner as the operation of the corresponding element of the warming base 102 as described above.

In some embodiments, the warming base 300 includes a proximity sensor 340. In some embodiments, the proximity sensor 340 is operative to identify the presence or absence of a bottle (e.g., the bottle 104), steaming system (e.g., the steaming system 200), or other object in the recess 150, and to operate the warming base 300 accordingly. For example, in some embodiments, a user may configure the warming base 300 to heat contents of the bottle 104 to a given temperature (e.g., using the mobile application software 182 or the user interface 306), and the warming base 300 may then delay activation of the inductive coil 310 until the proximity sensor 340 has identified the presence of the bottle 104 within the recess 302, at which point the warming base 300 may activate the inductive coil 310 to operate as described above. Similarly, in some embodiments, the warming base 300 may be operative to automatically deactivate the inductive coil 310 if the proximity sensor 340 has identified that the bottle 104 (or other object) has been removed from the recess 302. In some embodiments, the proximity sensor 340 may thereby improve the efficiency of power utilization by the warming base 300.

Figure 22:
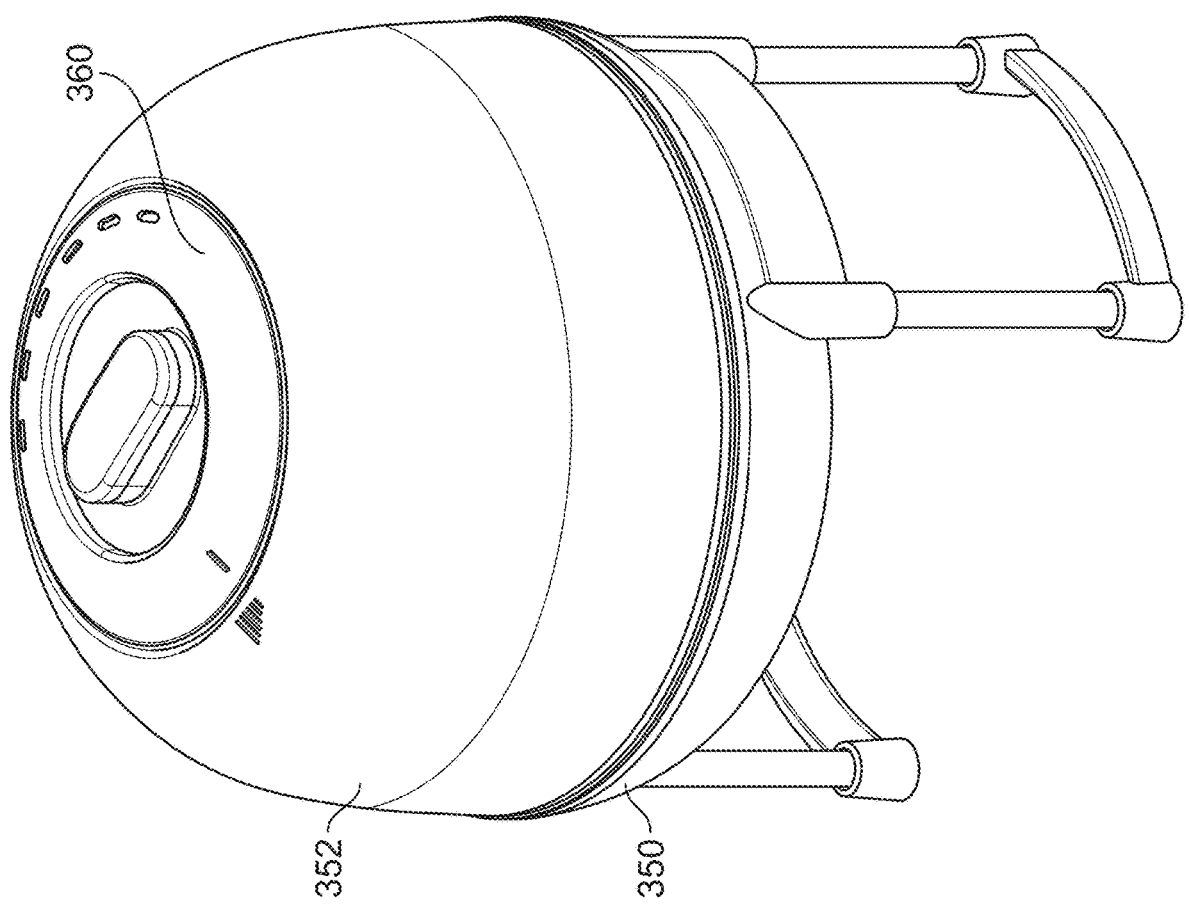
FIG. 22 is a perspective view of a steaming system, according to embodiments of the present disclosure.
Figure 23:
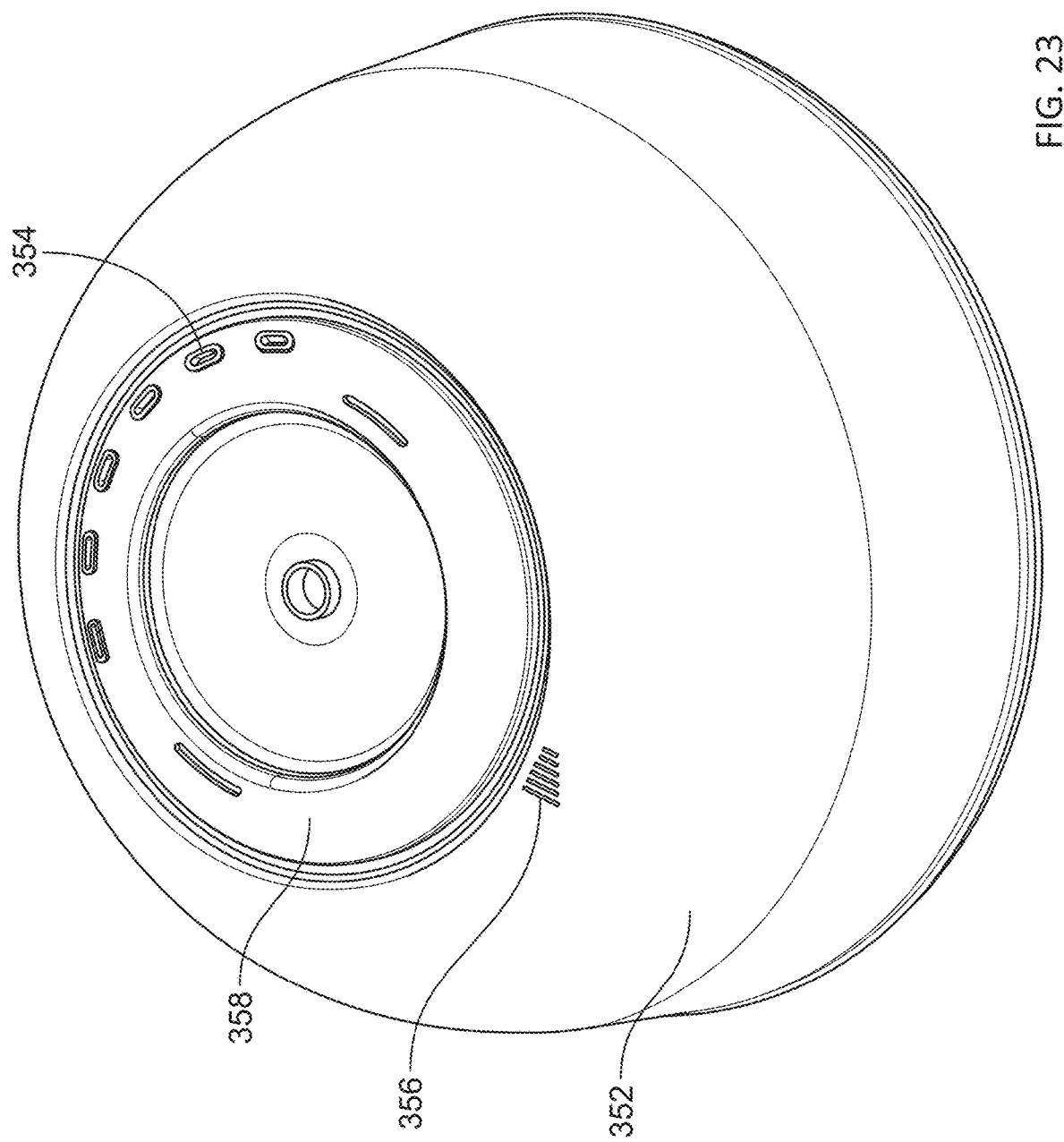
FIG. 23 is a perspective view of a cover of the steaming system shown in FIG. 22.

FIGS. 22 and 23 show another embodiment of a steaming system 350. FIG. 22 shows a perspective view of the steaming system 350. In some embodiments, the steaming system 350 is substantially similar to the steaming system 200 as described above (e.g., includes substantially the same elements and operates in substantially the same manner) other than as will be described hereinafter.

In some embodiments, the steaming system 350 includes a cover 352. FIG. 23 shows an exemplary embodiment of the cover 352. In some embodiments, the cover 352 includes a plurality of vent apertures 354. In some embodiments, the cover 352 includes a plurality of indicia 356. In some embodiments, the cover 352 includes a recess 358. In some embodiments, the vent apertures 354 and the indicia 356 are used to control venting of steam from the steaming system 350 as will be described hereinafter.

Figure 24:
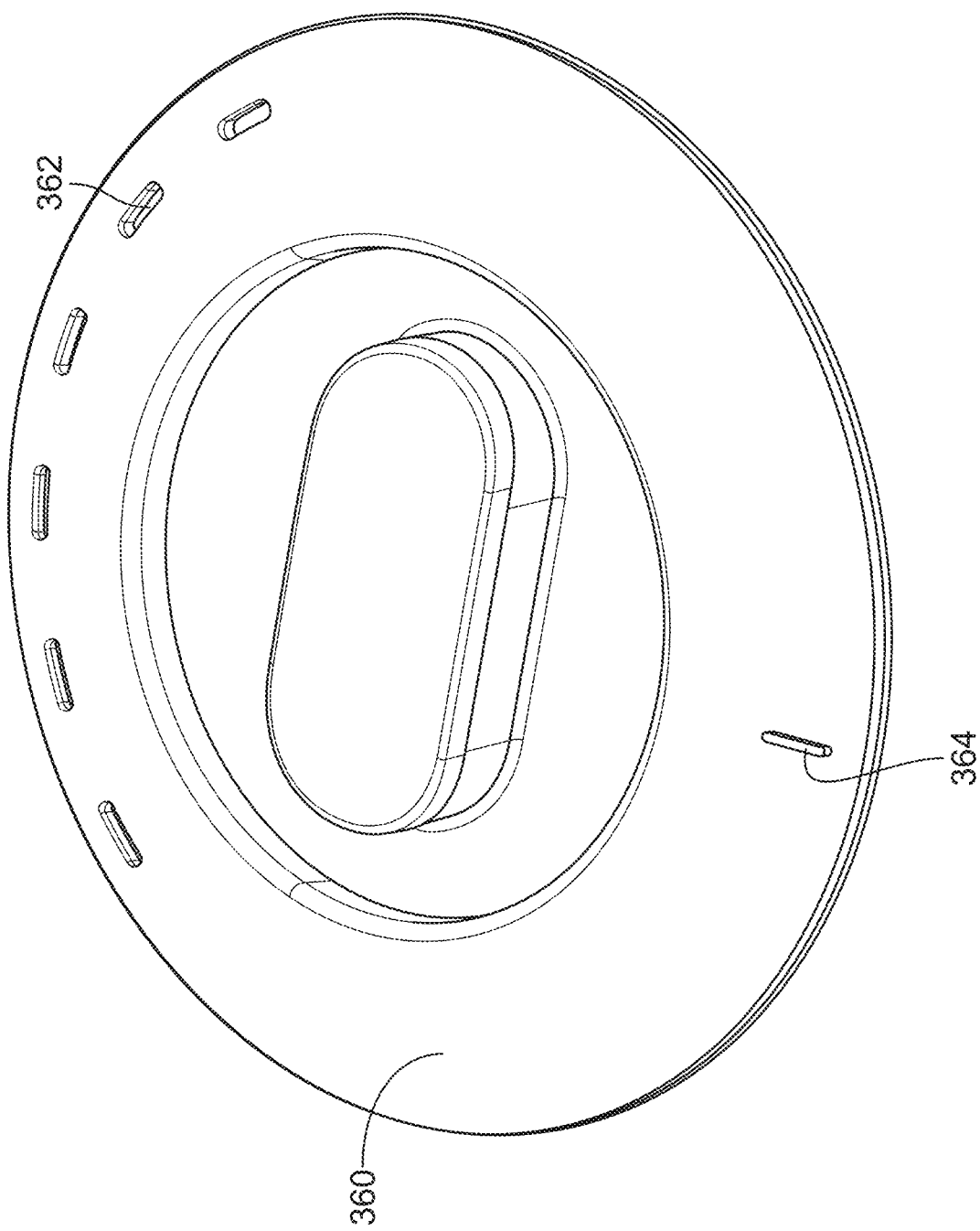
FIG. 24 is a perspective view of a vent cap of the steaming system shown in FIG. 22.

In some embodiments, the steaming system 350 includes a vent cap 360 that is sized and shaped to be positioned within the recess 358 of the cover 352. FIG. 24 shows an exemplary embodiment of the vent cap 360. In some embodiments, the vent cap 360 includes a plurality of vent apertures 362. In some embodiments, the vent cap 360 includes a pointer indicia 364. In some embodiments, the vent apertures 362 and the pointer indicia 364 are used to control venting of steam from the steaming system 350 as will be described hereinafter.

Referring back to FIG. 22, in some embodiments, when the steaming system 350 is assembled, the vent cap 360 is positioned within the recess 358. In some embodiments, the vent cap 360 is rotatably positioned within the recess 358 (e.g., is movable within the recess 358). In some embodiments, the vent apertures 354 of the cover 352 and the vent apertures 362 of the vent cap 360 are configured (e.g., sized, shaped, and positioned in relation to one another) such that an amount of the vent apertures 354 and the vent apertures 362 that is aligned with one another varies depending on the relative position of the vent cap 360 with respect to the cover 352 within the recess 358. Accordingly, in some embodiments, the amount of steam that can escape from within the steaming system 350 to an external environment can be controlled by a user by repositioning the vent cap 360. For example, in some embodiments, a user may wish to decrease the venting of steam to prolong sterilization. In some embodiments, a user may wish to increase the venting of steam to allow the steam within the steaming system 350 to be vented in order to prevent a scalding risk from a larger flow of steam that could result from removing the cover 352. In some embodiments, a user may wish to increase the venting of steam to allow contents of the steaming system 350 to begin to dry following a sterilization cycle.

Continuing to refer to FIG. 22, in some embodiments, when the vent cap 360 is positioned within the recess 358, the pointer indicia 364 is aligned with one of the indicia 356 of the cover 352. In some embodiments, different ones of the indicia 356 may correspond to and indicate different amounts of the vent apertures 362 that are aligned with the vent apertures 354. For example, in the embodiment shown in FIGS. 22 and 23, the indicia 356 includes a series of lines of varying lengths, in which a longer length line corresponds to a larger aligned portion of the vent apertures 362 and the vent apertures 354. In other embodiments, the indicia 356 may take other forms, such as numbers (e.g., 1, 2, 3, 4, 5, etc.), words (e.g., "small," "medium," "large," etc.) or other suitable indicators. In some embodiments, a user may thereby select the amounts of the vent apertures 362 that are aligned with the vent apertures 354 (and, accordingly, the amount of steam that is vented from within the steaming system 350) by aligning the pointer indicia 364 with a selected one of the indicia 356. In some embodiments, the indicia 356 include an indicator (e.g., the word "off" as shown in the embodiment of FIGS. 22 and 23) indicating that no portion of the vent apertures 362 is aligned with any portion of the vent apertures 354, and, accordingly, that no steam is vented from within the steaming system 350.

Figure 25:
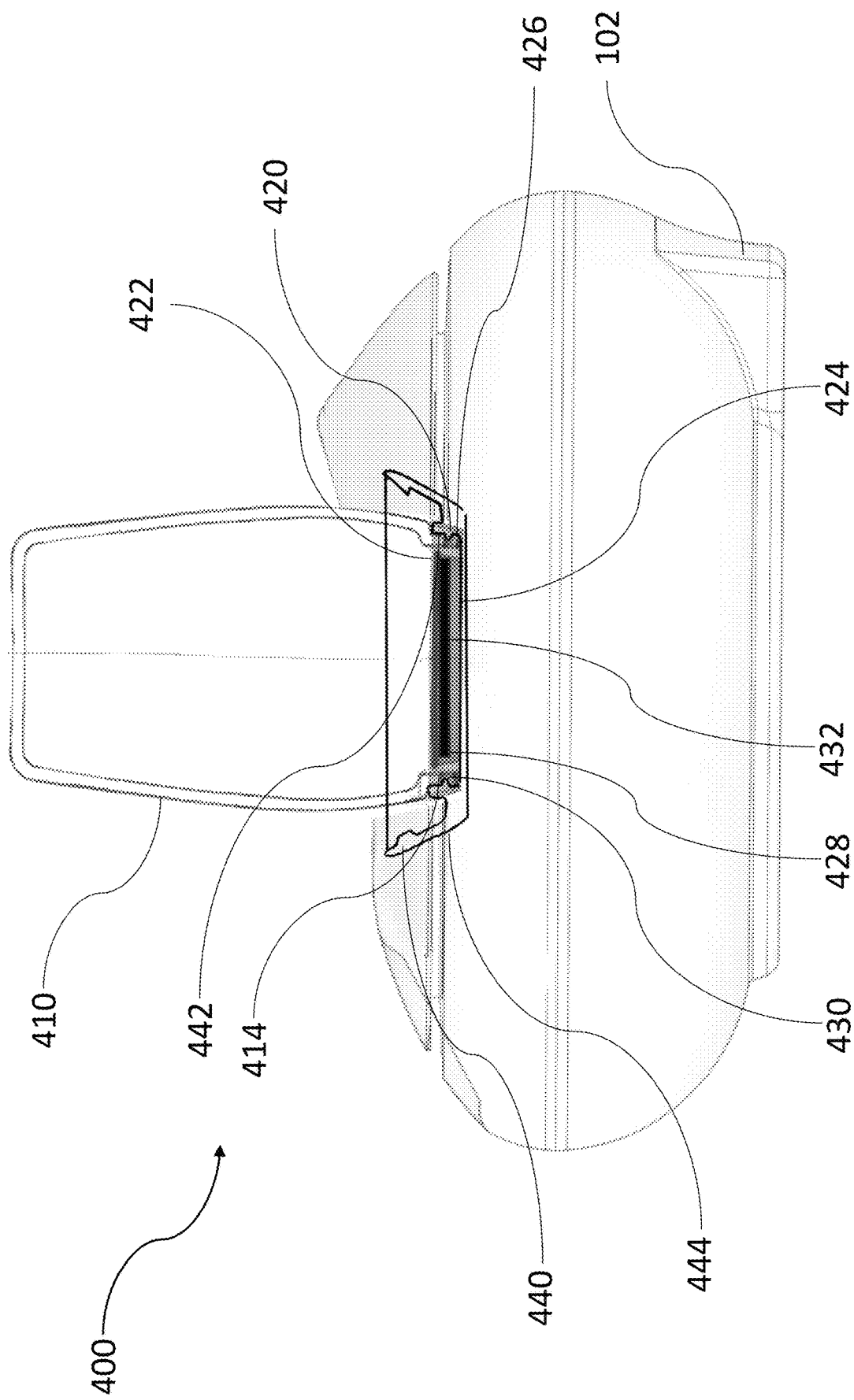
FIG. 25 is a section view of an assembled kit including a warming base, a bottle, a bottle lid assembly, and an adapter according to embodiments of the present disclosure.

In some embodiments, the warming base 102 or 300 is included as an element of a kit that includes elements allowing the warming base 102 or 300 to be used with differently sized bottles, for example, with bottles having lids that are smaller than the recess 150 of the warming base 102. FIG. 25 shows an exemplary kit 400. In some embodiments, the kit 400 includes a warming base (e.g., the warming base 102 or the warming base 300) that is configured and arranged as described above. The kit 400 and other exemplary kits will be described hereinafter with reference to the warming base 102, but description of the kit 400 should be understood to be equally applicable to the warming base 300.

In some embodiments, the kit 400 includes a bottle 410. In some embodiments, the bottle 410 is sized differently than the bottle 104 as described above as will be described hereinafter, but is otherwise substantially similar to the bottle 104.

In some embodiments, the kit 400 includes a lid assembly 420. In some embodiments, the lid assembly 420 is sized differently than the lid assembly 110 as described above in a manner that will be described hereinafter, but is otherwise substantially similar to the lid assembly 110. In some embodiments, the lid assembly 420 includes a main lid 422 having a top wall 424 and a side wall 426 that define an interior hollow 428. In some embodiments, the lid assembly 420 includes threading 430 that is complementary to the threading 414 of the bottle 410. In some embodiments, the lid assembly includes a heat plate 432 that is retained within the interior hollow 428.

In some embodiments, the lid assembly 420 is smaller than the lid assembly 110 as described above. More particularly, unlike the lid assembly 110, in some embodiments, the lid assembly 420 is not sized in a manner complementary to the recess 150. Accordingly, in some embodiments, when the lid assembly 420 is positioned within the recess 150, the side wall 426 of the lid assembly 420 does not abut or reside in close proximity to the side wall 153 of the recess 150, such that the lid assembly 420 can slide along the recess floor 152 and the bottle 410 is not prevented from tipping.

In some embodiments, the kit 400 includes an adapter 440. In some embodiments, the adapter 440 has an interior side 442 and an exterior side 444 opposite the interior side 442. In some embodiments, the interior side 442 is sized and shaped in a manner complementary to the lid assembly 420 such that the adapter 440 can be placed over the lid assembly 420 and fit closely thereon, as shown in FIG. 23. In some embodiments, the adapter 440 and the lid assembly 420 are configured to be removably engaged to one another (e.g., by a spring fit, snap fit, press fit, or other mechanical interlocking arrangement). In some embodiments, the exterior side 444 is sized and shaped in a manner complementary to the recess 150 such that, when the lid assembly 420 and adapter 440 are positioned within the recess 150 as shown, for example, in FIG. 22, the lid adapter 440 abuts or is in close proximity to the side wall 153 about all or most of the perimeter of the lid assembly, thereby preventing the adapter 440 and the lid assembly 420 from sliding within the recess 150, and preventing the bottle 410 from tipping.

In some embodiments, a kit includes the bottle 410, the lid assembly 420, and the adapter 440, and lacks the warming base 102. In some embodiments, such a kit includes the bottle 410 and the lid assembly 420 that are any desired size smaller than the recess 150, and the adapter 440 may be sized and shaped to allow the bottle 410 and the lid assembly 420 to be used together with the warming base 102. In some embodiments, the adapter 440 is sized and shaped so as to be compatible with the lid assembly 420 and with the recess 150 as described above, and is provided (e.g., packaged and/or commercialized) on its own and independently of any kit. For example, in some embodiments, the adapter 440 is provided as an accessory to the bottle 410 and the lid assembly 420 to allow the bottle 410 and the lid assembly 420 to be used together with the warming base 102.

In some embodiments, a warming base according to the present disclosure (e.g., the warming base 102 or the warming base 300) may be configured for use with additional accessories. FIGS. 26-29 show embodiments of accessories usable with an exemplary warming base. In some embodiments, each of the accessories described herein includes a heat plate that is configured and operates in a manner substantially similar to the heat plate 218 described above.

Figure 26:
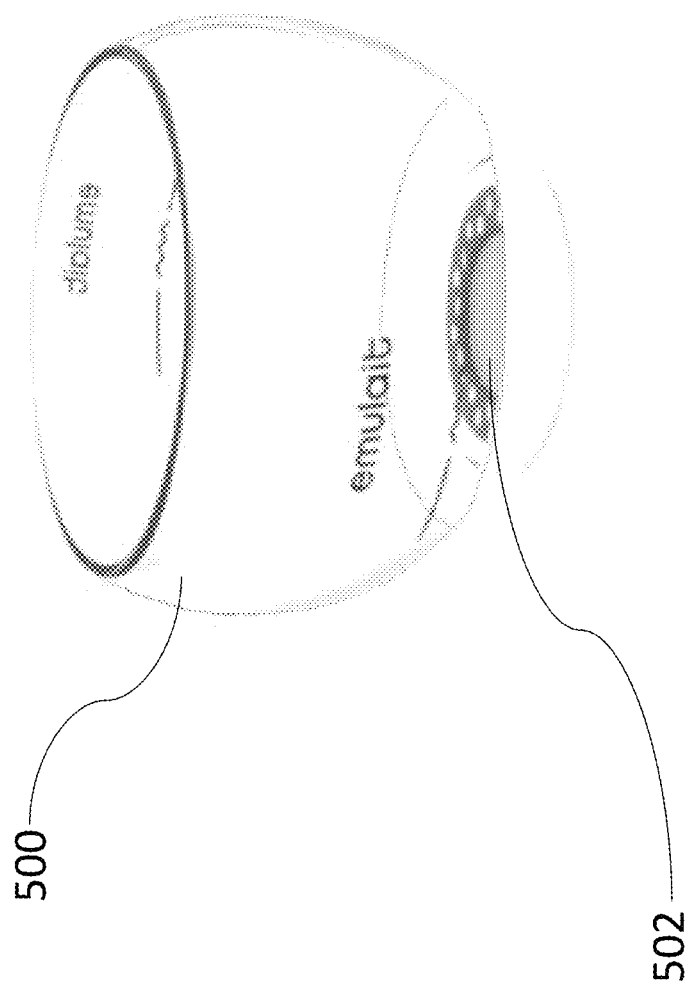
FIG. 26 is a perspective view of a defroster cup according to embodiments of the present disclosure.

FIG. 26 shows an exemplary accessory that is a defroster cup 500. In some embodiments, the defroster cup 500 is configured to receive and retain therein a breast milk storage bag (e.g., which may be filled with frozen breast milk to be thawed). In some embodiments, the defroster cup 500 includes a heat plate 502.

Figure 27:
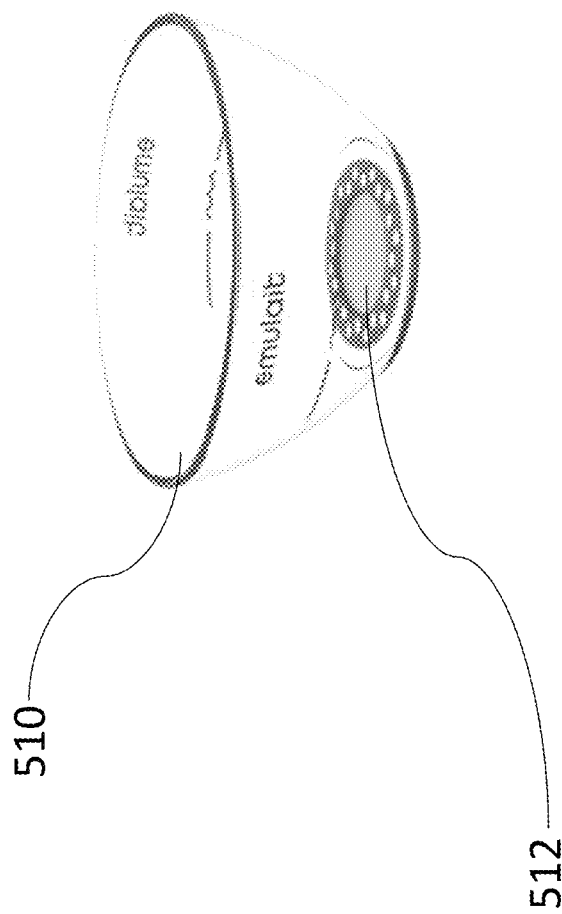
FIG. 27 is a perspective view of a bowl according to embodiments of the present disclosure.
Figure 28:
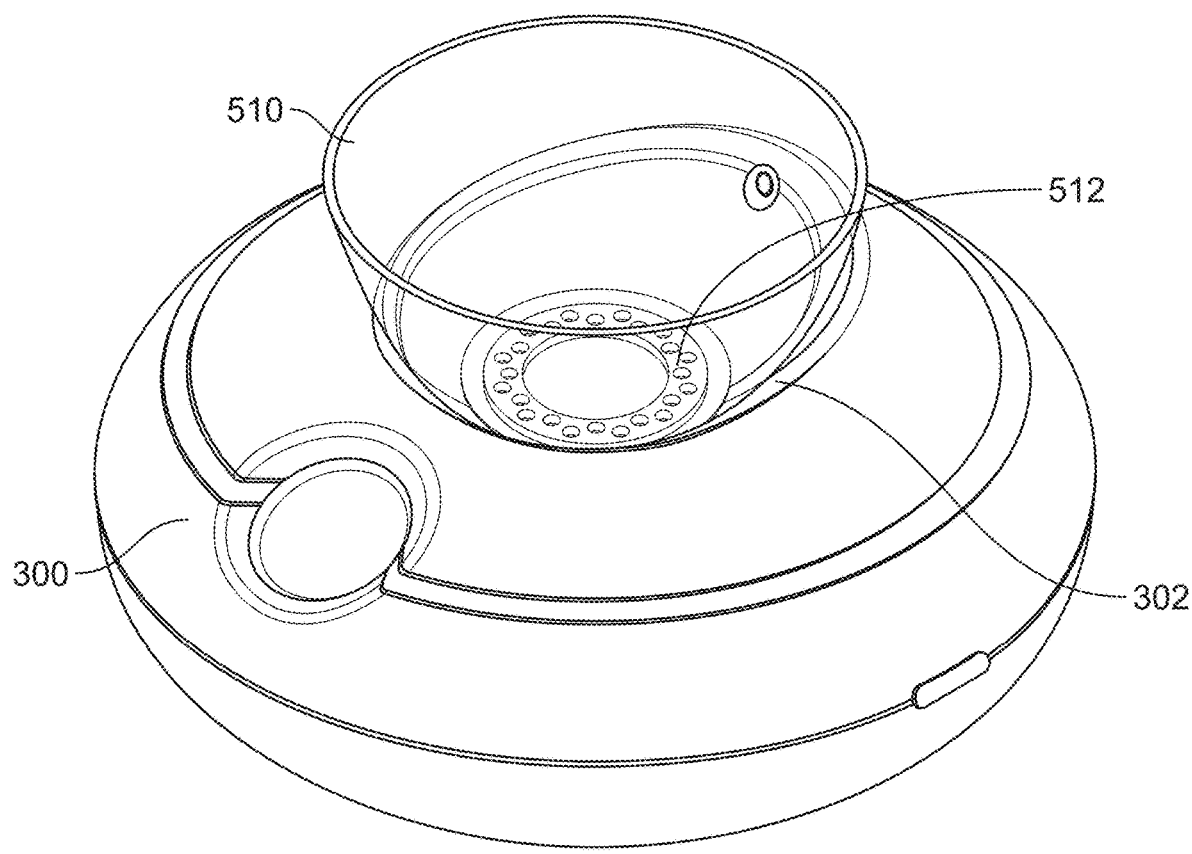
FIG. 28 is a perspective view of the bowl shown in FIG. 28 as positioned for use in conjunction with the warming base shown in FIG. 19.

FIG. 27 shows an exemplary accessory that is a bowl 510. In some embodiments, the bowl 510 is configured to hold a semisolid food, such as a food puree that is suitable for consumption by a toddler. In some embodiments, the bowl 510 includes a heat plate 512. FIG. 28 shows the bowl 510 as positioned within the recess 302 of the warming base 300 so as to position the heat plate 512 in proximity with the inductive coil 310 of the warming base 300, and so as to thereby heat the heat plate 512 and contents of the bowl 510.

Figure 29:
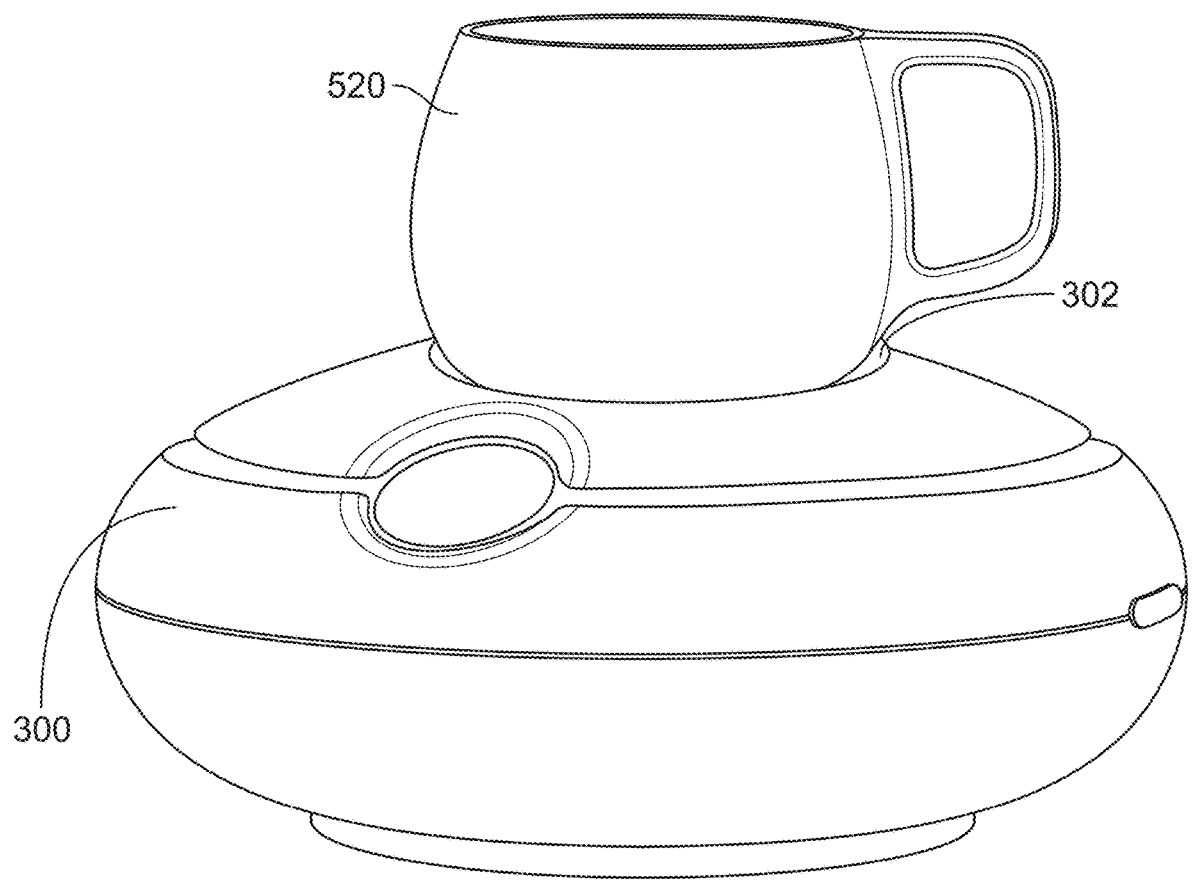
FIG. 29 is a perspective view of a drinking vessel according to embodiments of the present disclosure, the drinking vessel being shown as positioned for use in conjunction with the warming base shown in FIG. 19.

FIG. 29 shows an exemplary accessory that is a drinking vessel 520 (e.g., a mug suitable for containing hot beverages) as positioned within the recess 302 of the warming base 300. In some embodiments, the drinking vessel 520 includes a heat plate (not shown) that is positioned such that, when the drinking vessel 520 is positioned within the recess 302, the heat plate of the drinking vessel 520 is in proximity with the inductive coil 310 of the warming base 300, so as to thereby heat the heat plate of the drinking vessel 520 and contents of the drinking vessel 520.

The disclosure of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents. Elements described above with specific reference to one exemplary embodiment may be incorporated into other exemplary embodiments without departing from the broader principles embodied by the exemplary embodiments described herein.

What is claimed is:

1. A system, comprising:
   a warming base, comprising:
      a body having a top surface and a recess formed in the top surface; and
      an induction coil positioned within the body below the recess;
   a fluid container having an opening; and
   a lid, comprising:
      a lid body, and
      a conductive heat plate positioned within the lid body, wherein the conductive heat plate is disc-shaped,
      wherein the lid is configured to be removably attached to the opening so as to close the fluid container,
      wherein the lid body has a size and shape that are complementary to the recess of the warming base, so as to be configured for the lid to mate with the recess of the warming base to result in the conductive heat plate being positioned a suitable distance from the induction coil of the warming base,
      wherein the suitable distance is a distance such that, when an electrical current is applied to the induction coil, a magnetic field generated by the induction coil causes the conductive heat plate to heat, thereby heating contents of the fluid container.

2. The system of claim 1, wherein the fluid container is a baby bottle.

3. The system of claim 1, wherein the lid further comprises:
   at least one turbine-shaped blade,
      wherein the at least one turbine-shaped blade is shaped so as to induce circulation of the contents of the fluid container when a temperature differential exists across the contents of the fluid container.

4. The system of claim 1, wherein the warming base further comprises at least one sensor.

5. The system of claim 4,
   wherein the at least one sensor comprises a temperature sensor configured to detect a current temperature of the contents of the fluid container, and
   wherein, when the current temperature exceeds a threshold temperature, the warming base is configured to at least one of:
      (a) discontinue application of the electrical current to the induction coil, or
      (b) indicate to a user that the contents of the fluid container are ready for use.

6. The system of claim 4, wherein the at least one sensor comprises a pressure sensor.

7. The system of claim 4,
   wherein the at least one sensor comprises a proximity sensor configured to detect a presence or an absence of at least one of the fluid container or the lid within the recess, and wherein at least one of:
      (a) the warming base is configured to begin application of the electrical current to the induction coil when the proximity sensor detects the presence of the at least one of the fluid container or the lid within the recess, or
      (b) the warming base is configured to discontinue application of the electrical current to the induction coil when the proximity sensor detects the absence of the at least one of the fluid container or the lid within the recess.

8. The system of claim 1, further comprising:
   a steaming system, wherein the steaming system comprises:
      a steamer base that is shaped to contain water,
      a steamer conductive heat plate positioned within the steamer base, and
      a steamer cover configured to be coupled to the steamer base so as to define a fluid-tight sterilization chamber between the steamer cover and the steamer base,
      wherein the steamer base has a size and shape that are complementary to the recess of the warming base, so as to be configured for the steamer base to mate with the recess of the warming base to result in the steamer conductive heat plate being positioned a suitable distance from the induction coil of the warming base,
      wherein the suitable distance is a distance such that, when an electrical current is applied to the induction coil, a magnetic field generated by the induction coil causes the steamer conductive heat plate to heat, thereby heating water contained within the steamer base sufficiently to cause the water to form steam to thereby sterilize an object contained within the sterilization chamber.

9. The system of claim 8, wherein the steamer cover comprises a vent that is movable between at least:
   a closed position, in which the vent prevents the steam from escaping the sterilization chamber, and
   an opened position, in which the vent allows at least some of the steam to escape the sterilization chamber through the vent.

10. The system of claim 1, further comprising:
    at least one accessory sized and shaped to hold accessory contents,
       wherein the at least one accessory comprises an accessory conductive heat plate,
       wherein the at least one accessory has a size and shape that are complementary to the recess of the warming base, so as to be configured for the at least one accessory to mate with the recess of the warming base to result in the accessory conductive heat plate being positioned a suitable distance from the induction coil of the warming base,
       wherein the suitable distance is a distance such that, when an electrical current is applied to the induction coil, a magnetic field generated by the induction coil causes the accessory conductive heat plate to heat, thereby heating the accessory contents.

11. The system of claim 10, wherein the at least one accessory comprises a defroster cup configured to hold a breast milk storage bag, a bowl configured to hold a pureed food, or a drinking vessel.

12. A method, comprising:
    attaching a lid to a fluid container,
       wherein the fluid container comprises an opening,
       wherein the fluid container contains a fluid, wherein the lid comprises:
a lid body, and
a conductive heat plate positioned within the lid body,
wherein the conductive heat plate is disc-shaped,
wherein the lid is removably attached to the opening of the fluid container so as to close the fluid container;
positioning the lid and the fluid container within a warming base,
wherein the warming base comprises:
a body having a top surface and a recess formed in the top surface, and
an induction coil positioned within the body below the recess, and
wherein the positioning the lid and the fluid container within the warming base comprises mating the lid with the recess of the warming base to result in the conductive heat plate being positioned a suitable distance from the induction coil of the warming base; and
activating the warming base,
wherein the step of activating the warming base results in the warming base applying an electrical current to the induction coil, and
wherein application of the electrical current to the induction coil induces a magnetic field that is sufficient to heat the conductive heat plate, thereby causing the conductive heat plate to heat the fluid contained by the fluid container.

13. The method of claim 12, wherein the fluid container is a baby bottle.

14. The method of claim 12, further comprising:
prior to the step of positioning the lid and the fluid container within the warming base, engaging an adapter to the lid,
wherein the adapter comprises an interior surface and an exterior surface opposite the interior surface,
wherein the interior surface of the adapter has a size and shape that are complementary to the lid body so as to allow the lid body to be received and retained within the adapter,
wherein the exterior surface of the adapter has a size and shape that are complementary to the recess of the warming base, so as to be configured for the adapter having the lid received and retained therein to mate with the recess of the warming base to result in the conductive heat plate of the lid being positioned the suitable distance from the induction coil of the warming base.

15. The method of claim 12, further comprising:
prior to the step of activating the warming base, setting a threshold heating temperature for the fluid,
wherein the warming base comprises a temperature sensor configured to detect a current temperature of the fluid, and
wherein, when the current temperature exceeds the threshold heating temperature, the warming base is configured to at least one of:
(a) discontinue application of the electrical current to the induction coil, or
(b) indicate to a user that the fluid is ready for use.

16. The method of claim 12, wherein the step of activating the warming base is performed using one of a user interface positioned on the warming base or a software application executed by an electronic device that is communicatively coupled to the warming base.

17. A system, comprising:
a warming base, comprising:
a body having a top surface and a recess formed in the top surface; and
an induction coil positioned within the body below the recess;
a fluid container having an opening;
a lid, comprising:
a lid body, and
a conductive heat plate positioned within the lid body,
wherein the conductive heat plate is disc-shaped,
wherein the lid is configured to be removably attached to the opening so as to close the fluid container; and
an adapter having an interior surface and an exterior surface opposite the interior surface,
wherein the interior surface of the adapter has a size and shape that are complementary to the lid body so as to allow the lid body to be received and retained within the adapter,
wherein the exterior surface of the adapter has a size and shape that are complementary to the recess of the warming base, so as to be configured for the adapter having the lid received and retained therein to mate with the recess of the warming base to result in the conductive heat plate of the lid being positioned a suitable distance from the induction coil of the warming base,
wherein the suitable distance is a distance such that, when an electrical current is applied to the induction coil, a magnetic field generated by the induction coil causes the conductive heat plate to heat, thereby heating contents of the fluid container.

18. The system of claim 17, wherein the fluid container is a baby bottle.

19. The system of claim 17, wherein the lid further comprises:
at least one turbine-shaped blade,
wherein the at least one turbine-shaped blade is shaped so as to induce circulation of the contents of the fluid container when a temperature differential exists across the contents of the fluid container.

20. The system of claim 17, wherein the warming base further comprises at least one sensor,
wherein the at least one sensor comprises at least one of:
(1) a temperature sensor configured to detect a current temperature of the contents of the fluid container, and
wherein, when the current temperature exceeds a threshold temperature, the warming base is configured to at least one of:
(a) discontinue application of the electrical current to the induction coil, or
(b) indicate to a user that the contents of the fluid container are ready for use,
(2) a pressure sensor, or
(3) a proximity sensor configured to detect a presence or an absence of at least one of the fluid container or the lid within the recess, and
wherein the warming base is configured to at least one of:
(a) begin application of the electrical current to the induction coil when the proximity sensor detects the presence of the at least one of the fluid container or the lid within the recess, or
(b) discontinue application of the electrical current to the induction coil when the proximity sensor detects the absence of the at least one of the fluid container or the lid within the recess.

* * * * *